(12) United States Patent
Choi et al.

(10) Patent No.: US 11,155,472 B2
(45) Date of Patent: Oct. 26, 2021

(54) ONE-DIMENSIONAL NANO-CHAIN STRUCTURE AND PREPARING METHOD THEREOF

(71) Applicant: Research & Business Foundation Sungkyunkwan University, Suwon-si (KR)

(72) Inventors: Jae-Young Choi, Suwon-si (KR); Sudong Chae, Seoul (KR); Seungbae Oh, Suwon-si (KR); Bum Jun Kim, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 0 days.

(21) Appl. No.: 16/591,695

(22) Filed: Oct. 3, 2019

(65) Prior Publication Data
US 2020/0115252 A1    Apr. 16, 2020

(30) Foreign Application Priority Data

Oct. 11, 2018  (KR) .......................... 10-2018-0121415
Oct. 11, 2018  (KR) .......................... 10-2018-0121416

(51) Int. Cl.
| | |
|---|---|
| *B82Y 40/00* | (2011.01) |
| *C01B 35/14* | (2006.01) |
| *C01G 31/02* | (2006.01) |
| *C01G 35/00* | (2006.01) |
| *C01G 33/00* | (2006.01) |

(52) U.S. Cl.
CPC .............. *C01G 31/02* (2013.01); *C01B 35/14* (2013.01); *C01G 33/00* (2013.01); *C01G 35/00* (2013.01); *B82Y 40/00* (2013.01)

(58) Field of Classification Search
None
See application file for complete search history.

(56) References Cited

U.S. PATENT DOCUMENTS

2013/0250260 A1* 9/2013 Singh ........................ G03F 1/62
355/53

OTHER PUBLICATIONS

Meerschaut, A. et al. "The Crystal Structure of Niobium Selenide Nb2Se9 from Twin-Crystal Data". Acta. Cryst. B 35, 1747-1750 (1979). (Year: 1979).*
Seifert, G. et al. "Stability of Metal Chalcogenide Nanotubes". J. Phys. Chem. 106, 2497-2501 (2002) (Year: 2002).*
Srivastava. S.K. and Avasthi, B. N. "Review Layer type Tungsten Dichalcogenide compounds: their preparation, structure, properties and uses". Journal of Materials Science. 20. 3801-3815 (1985). (Year: 1985).*
Definition of Single Crystal. Developing Solid Oral Dosage Forms. Science Direct 2017. (Year: 2017).*
Sanjines. R, et al. "Synthesis and Characterization of Nb-2Se9 . . . ". Mat. Res. Bull. vol. 23. 549-553 (1988). (Year: 1988).*
Definition of Crystallographic. Merriam-Websters. 2020 (Year: 2020).*

(Continued)

*Primary Examiner* — Sheng H Davis
(74) *Attorney, Agent, or Firm* — NSIP Law

(57) ABSTRACT

The present disclosure relates to a one-dimensional nano-chain structure including a single crystal structure as a minimum repeat unit structure.

6 Claims, 27 Drawing Sheets
(18 of 27 Drawing Sheet(s) Filed in Color)

(56) References Cited

OTHER PUBLICATIONS

Ivanovskaya, V. V., et al. "Electronic Properties of Superconducting NbSe2 nanotubes". Phys. Stat. Sol. (b). R1-R4, No. 3, 238 (2003). (Year: 2003).*

Rouxel, Jean. Crystal Chemistry and Properties of Materials with Quasi-One-Dimensional Structures. Phys and Chem. of Materials with Low Dimensional Structures. D. Reidel Publishing Company. 1986. (Year: 1986).*

Xing-Cai, Wu, et al. "Controlled Growth and Field-Emission Properties of NbSe2 . . . ". Journal of Nanoscience and Nanotechnology. vol. 10, 6465-6472 (2010). (Year: 2010).*

Oh et al., "Synthesis of a one-dimensional atomic crystal of vanadium selenide ($V_2Se_9$)," The Royal Society of Chemistry, Published on Oct. 3, 2018, pp. 33980-33984 (5 pages in English).

Chae et al., "Design of dispersant structure for highly concentrated one-dimensional inorganic molecular chain from $V_2Se_9$ crystal," The Royal Society of Chemistry, 2013 (5 pages in English).

Kim et al., "Exfoliation and Characterization of $V_2Se_9$ Atomic Crystals," Nanomaterials, 2018 (8 pages in English).

Chae et al., "Design of dispersant structures for preparing highly concentrated one-dimensional inorganic molecular chains from $V_2Se_9$ crystals," The Royal Society of Chemistry, Published on Oct. 3, 2018, pp. 12190-12193 (4 pages in English).

Oh et al., "Inorganic Molecular Chain $Nb_2Se_9$: Synthesis of Bulk Crystal and One-Atom-Thick Level Exfoliation," Rapid Research Letter, 2018 (7 pages in English).

Chae et al., "Isolation of $Nb_2Se_9$ Molecular Chain from Bulk One-Dimensional Crystal by Liquid Exfoliation," Nanomaterials, 2018 (9 pages in English).

Kuchibhatla et al., "One dimensional nanostructured materials," Progress in Materials Science, vol. 52, No. 5, 2007, pp. 699-913 (215 pages in English).

* cited by examiner

CONVENTIONAL TWO-DIMENSIONAL MATERIAL

ONE-DIMENSIONAL NANOSTRUCTURE BUNDLE OF PRESENT DISCLOSURE

| Element | Atomic% | Ratio |
|---------|---------|-------|
| S K | 80.35 | 4 |
| V K | 19.65 | 1 |
| Totals | | |

ONE-DIMENSIONAL NANO-CHAIN STRUCTURE AND PREPARING METHOD THEREOF

CROSS-REFERENCE TO RELATED APPLICATIONS

This application claims the benefit of Korean Patent Application No. 10-2018-0121415 filed on 10 Nov. 2018, and Korean Patent Application No. 10-2018-0121416 filed on 10 Nov. 2018, the disclosures of which are incorporated herein by reference.

TECHNICAL FIELD

The present disclosure relates to a one-dimensional nano-chain structure and a preparing method thereof.

BACKGROUND

With the miniaturization and enhancement of performance of electronic devices in recent years, nanoscale devices have emerged. To manufacture such nanoscale devices, technologies for forming nanowires have been developed. The term "nanowire" as used herein refers to an ultrafine wire having a cross-sectional diameter of from several tens of nm to several hundreds of nm. Further, the nanowire can be grown to have a length that is several tens to several hundreds times the diameter.

The nanowire may exhibit different electrical, chemical, physical, and optical characteristics from general characteristics of an existing bulk structure. More intricate and integrated devices can be implemented by using molecular characteristics of nanowire together with the characteristics of the bulk structure. The nanowire can be used in various fields such as lasers, transistors, memories, or sensors.

Meanwhile, mainly due to the existence of broken bonds, i.e., dangling bonds, of surface atoms of a nanomaterial such as a nanowire, the properties of the nanomaterial, such as electrical conductivity, mobility, thermal conduction, and the like are rapidly degraded as the nanomaterial decreases in size. Therefore, the nanomaterial is limited in application to a nanodevice for high integration.

Two-dimensional materials which have been actively researched in recent years also show the same phenomenon. It is known that when a two-dimensional material is formed into a ribbon having a width of several tens of nm or less, the mobility rapidly decreases due to dangling bonds present on the edge of the ribbon.

Currently, even in the development of nanoprocessing for high integration of memories and system semiconductors, as wires (copper) and semiconductors (silicon) decrease in width to about 10 nm, the conductivity and charge mobility rapidly decrease. This is a very important technical issue for high integration of semiconductors.

An article entitled "One Dimensional Nanostructured Materials" by Kuchibhatla, et al. in Progress in Materials Science, vol. 52, no. 5, 2007, pp. 699-913, which is a background technology of the present disclosure, relates to one-dimensional nanostructured materials. However, this article discloses only materials having various nanostructures, but does not recognize a one-dimensional structure without a dangling bond on its lateral surfaces.

SUMMARY

In view of the foregoing, the present disclosure provides a one-dimensional nano-chain structure and a preparing method thereof.

However, problems to be solved by the present disclosure are not limited to the above-described problems. There may be other problems to be solved by the present disclosure.

According to a first aspect of the present disclosure, there is provided a one-dimensional nano-chain structure including a single crystal structure as a minimum repeat unit structure.

In accordance with an embodiment of the present disclosure, the one-dimensional nano-chain structure does not have a dangling bond on its lateral surfaces, but may not be limited thereto.

In accordance with an embodiment of the present disclosure, the one-dimensional nano-chain structure may have a thickness of 10 nm or less, but may not be limited thereto.

In accordance with an embodiment of the present disclosure, the minimum repeat unit structure may include an inorganic molecule, but may not be limited thereto.

In accordance with an embodiment of the present disclosure, the minimum repeat unit structure may be represented by the following Chemical Formula 1, but may not be limited thereto:

$$M_2X_9 \qquad \text{[Chemical Formula 1]}$$

(in the above Chemical Formula 1, M is V, Nb, Ta, or Db and X is S, Se, Te, or Po).

In accordance with an embodiment of the present disclosure, the one-dimensional nano-chain structure may include a unit structure selected from the group consisting of $V_2Se_9$, $Nb_2Se_9$, $Ta_2Se_9$, $Db_2Se_9$, $V_2Te_9$, $Nb_2Te_9$, $Ta_2Te_9$, $Db_2Te_9$, and combinations thereof, but may not be limited thereto.

In accordance with an embodiment of the present disclosure, the one-dimensional nano-chain structure may be bonded to each other by a van der Waals force, but may not be limited thereto.

Further, according to a second aspect of the present disclosure, there is provided a one-dimensional nanostructure bundle in which one-dimensional nano-chain structures according to the first aspect of the present disclosure are bonded by a van der Waals force.

Furthermore, according to a third aspect of the present disclosure, there is provided a preparing method of a one-dimensional nano-chain structure according to the first aspect of the present disclosure, including separating the one-dimensional nano-chain structure from a one-dimensional single crystal bulk material.

In accordance with an embodiment of the present disclosure, the preparing method of a one-dimensional nano-chain structure may include: dispersing the one-dimensional single crystal bulk material in a solvent; irradiating an ultrasonic wave to the solvent; and separating the one-dimensional nano-chain structure from the solvent, but may not be limited thereto.

In accordance with an embodiment of the present disclosure, the preparing method of a one-dimensional nano-chain structure may further include synthesizing the one-dimensional single crystal bulk material by a flux method, but may not be limited thereto.

In accordance with an embodiment of the present disclosure, the flux method may include mixing and heat-treating a transition metal precursor and a selenide precursor, but may not be limited thereto.

In accordance with an embodiment of the present disclosure, the one-dimensional single crystal bulk material may include the one-dimensional nano-chain structures bonded by a van der Waals force, but may not be limited thereto.

In accordance with an embodiment of the present disclosure, the solvent may include a functional group selected from the group consisting of a carboxyl group, a hydroxy group, an amine group, and combinations thereof, but may not be limited thereto.

In accordance with an embodiment of the present disclosure, the process of separating the one-dimensional nano-chain structure may be performed by an exfoliation method, but may not be limited thereto.

In accordance with an embodiment of the present disclosure, the exfoliation method may be selected from the group consisting of mechanical exfoliation, liquid exfoliation, ultrasonication, intercalation, electrochemical exfoliation, wet chemical exfoliation, reduction exfoliation, and combinations thereof, but may not be limited thereto.

The above-described aspects are provided by way of illustration only and should not be construed as liming the present disclosure. Besides the above-described embodiments, there may be additional embodiments described in the accompanying drawings and the detailed description.

According to the above-described aspects of the present disclosure, a one-dimensional nano-chain structure of the present disclosure has inorganic composition as well as a chain molecular structure which is characteristic of an organic material unlike conventional nanomaterials (e.g., nanowires, nanorods, and the like). Therefore, the one-dimensional nano-chain structure of the present disclosure can have flexibility and elasticity which are characteristic of an organic material as well as excellent thermal, mechanical and/or chemical stability which are characteristic of an inorganic material.

Further, the one-dimensional nano-chain structure of the present disclosure has a thickness of several nm and thus can be expected to have excellent electrical and physical characteristics induced by one-dimensional structural features.

Furthermore, the one-dimensional nano-chain structure of the present disclosure does not have defects, i.e., dangling bonds, on the surface and the edge unlike conventional nanomaterials and two-dimensional materials. Therefore, even when its diameter decreases to a molecular level, there is no degradation in electrical/electronic properties. Also, when quantum effects occur, properties such as electrical conductivity, mobility, thermal conduction, and the like can be improved.

Moreover, the one-dimensional nano-chain structure of the present disclosure has structural features of linear inorganic molecules. Therefore, it is possible to develop an inorganic material having flexibility and also possible to develop a high-performance device having a large surface area.

However, the effects to be obtained by the present disclosure are not limited to the above-described effects. There may be other effects to be obtained by the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the detailed description that follows, embodiments are described as illustrations only since various changes and modifications will become apparent to those skilled in the art from the following detailed description. The use of the same reference numbers in different figures indicates similar or identical items.

Figure 10:
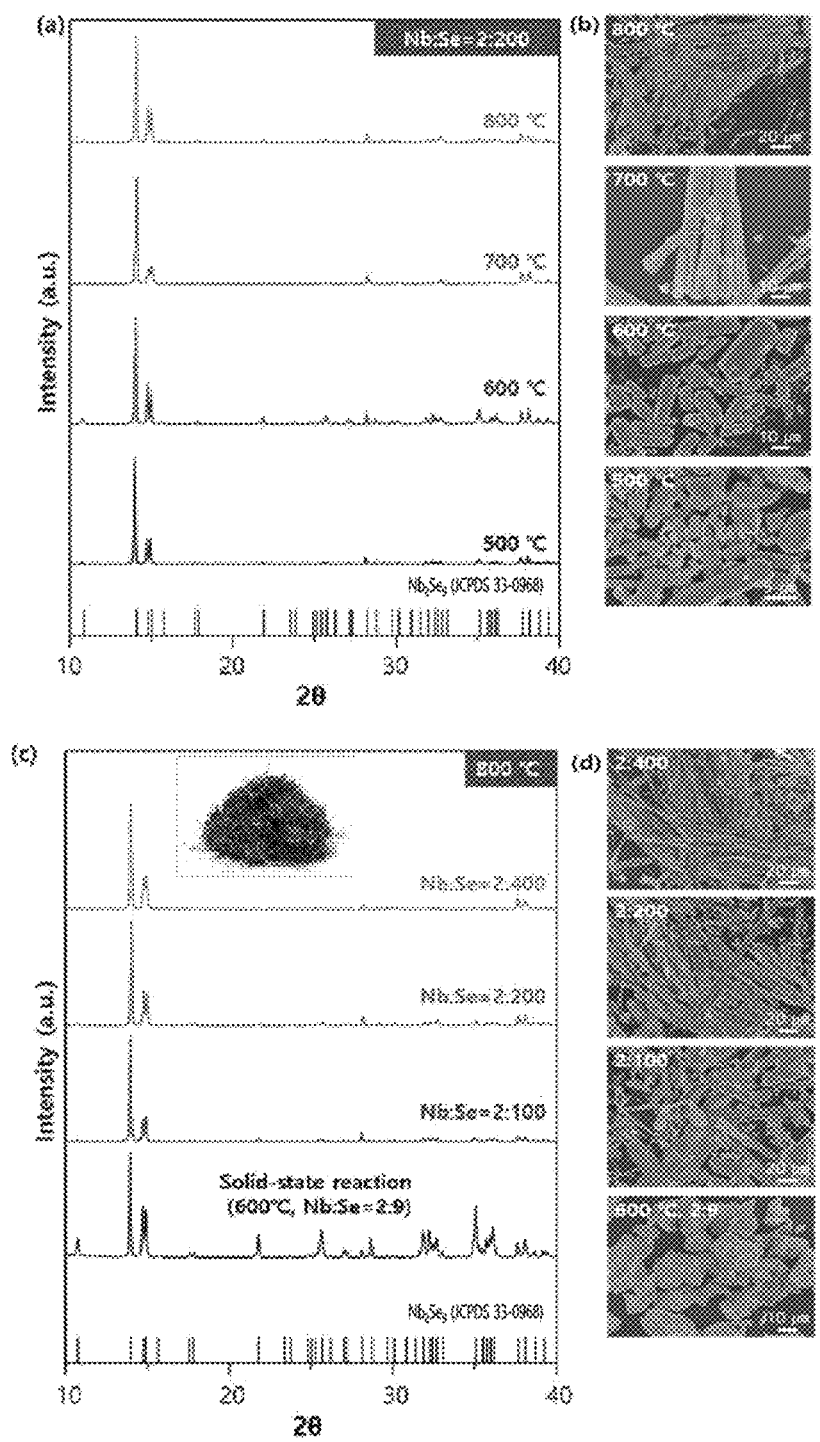

(a) and (b) of FIG. 10 show an XRD pattern and SEM images of a one-dimensional nano-chain structure according to an example of the present disclosure depending on the process temperature, and (c) and (d) of FIG. 10 show an XRD pattern and SEM images of the one-dimensional nano-chain structure according to an example of the present disclosure depending on the proportion of materials.

Figure 11:
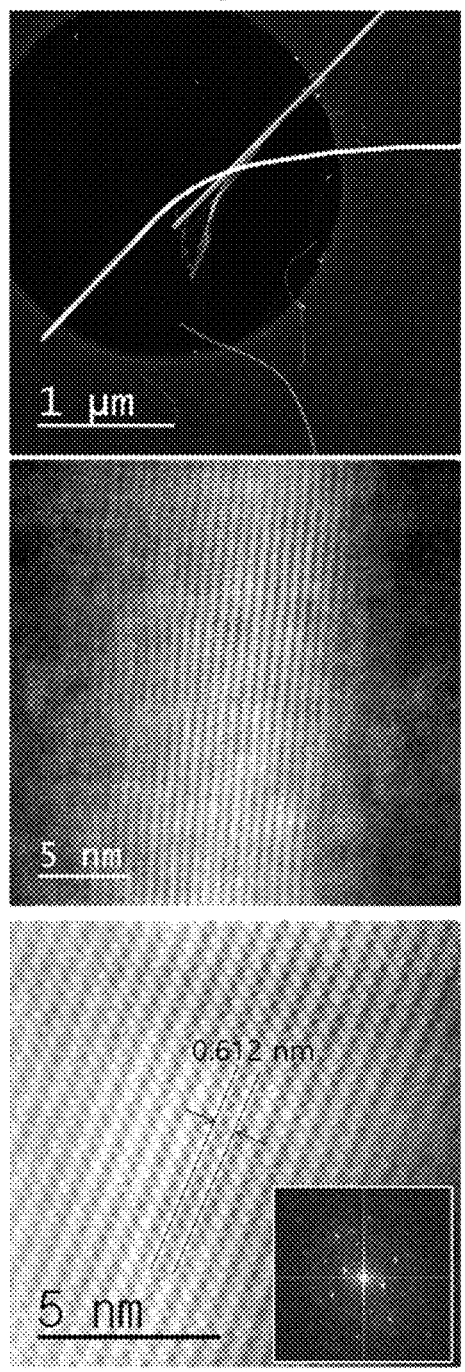

FIG. 11 shows TEM images of a one-dimensional nano-chain structure according to an example of the present disclosure.

Figure 12:
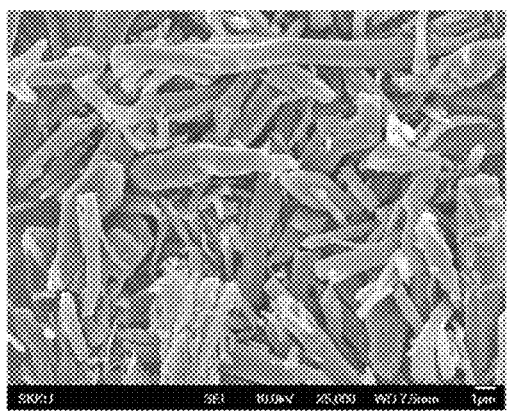
Figure 12:
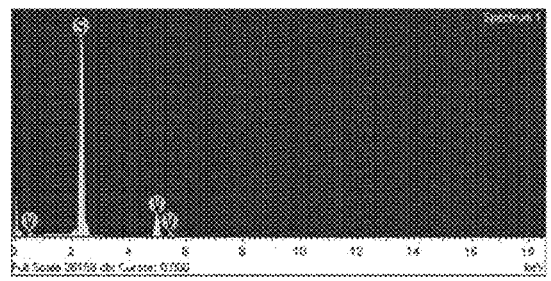

FIG. 12 shows a scanning electron microscope (SEM) image and an EDS result graph of a one-dimensional bulk material according to an example of the present disclosure.

Figure 13:
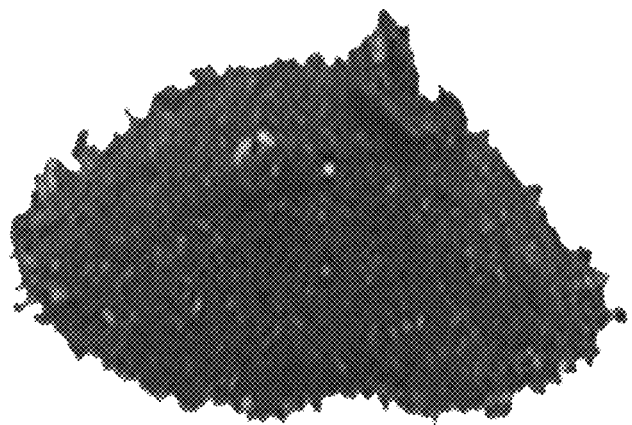

FIG. 13 is a photomicrograph of the one-dimensional bulk material according to an example of the present disclosure.

Figure 14:
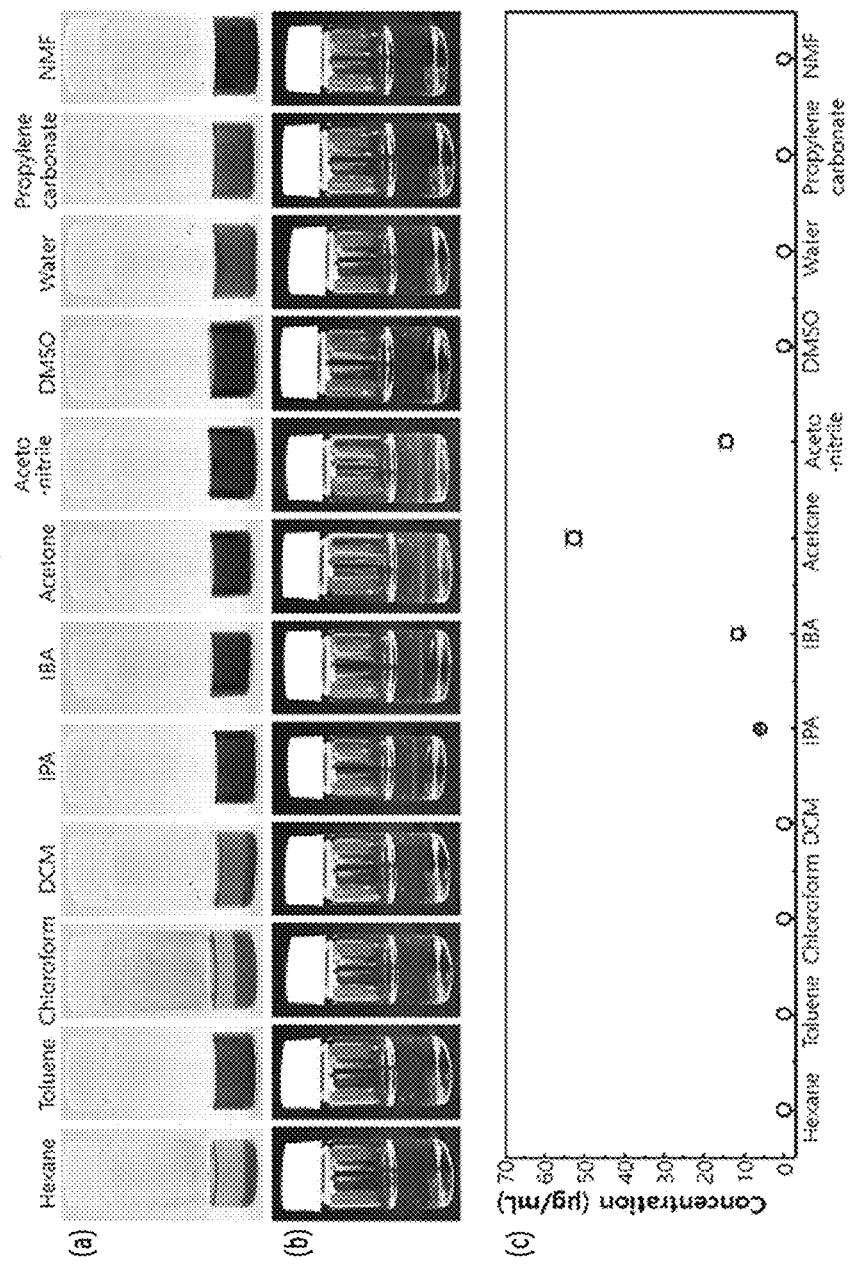

(a) of FIG. 14 shows solvents for powder according to an example of the present disclosure, (b) of FIG. 14 shows the powder dispersed in the solvents, and (c) of FIG. 14 is a graph showing the dispersion result.

Figure 15:
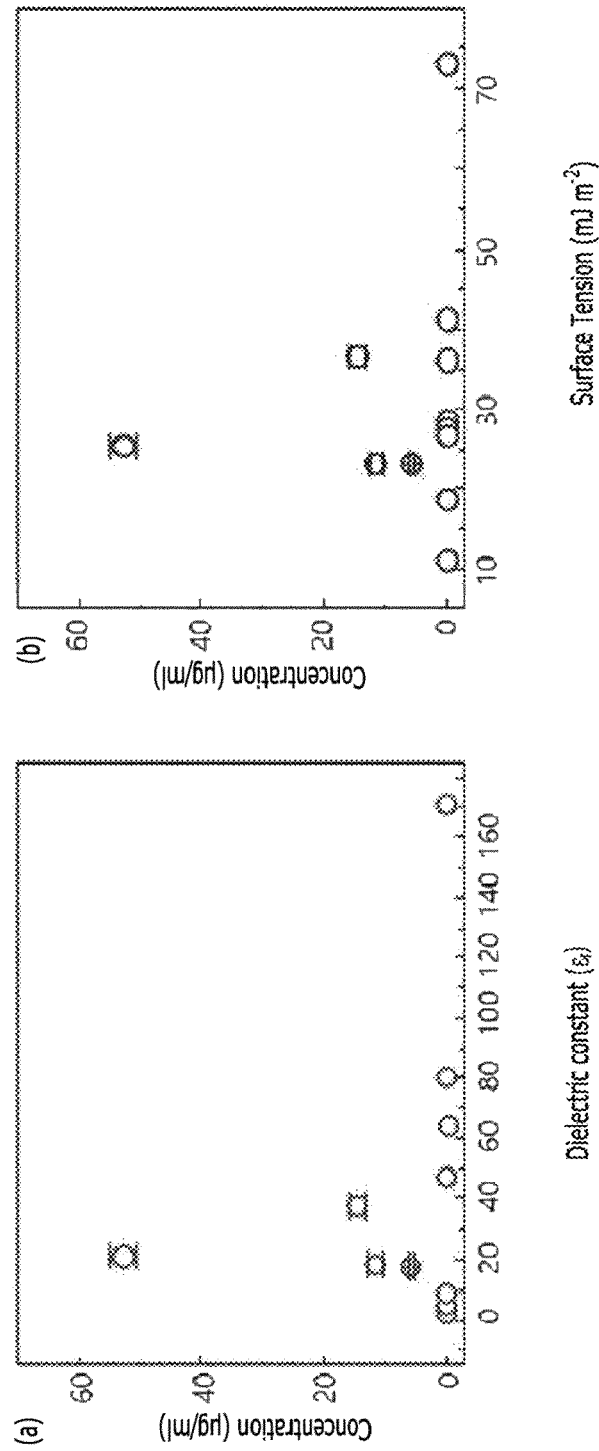

(a) of FIG. 15 is a graph of dispersion concentration of the powder against dielectric constant of the solvents according to an example of the present disclosure and (b) of FIG. 15 is a graph of dispersion concentration of the powder against surface tension of the solvents according to an example of the present disclosure.

Figure 16:
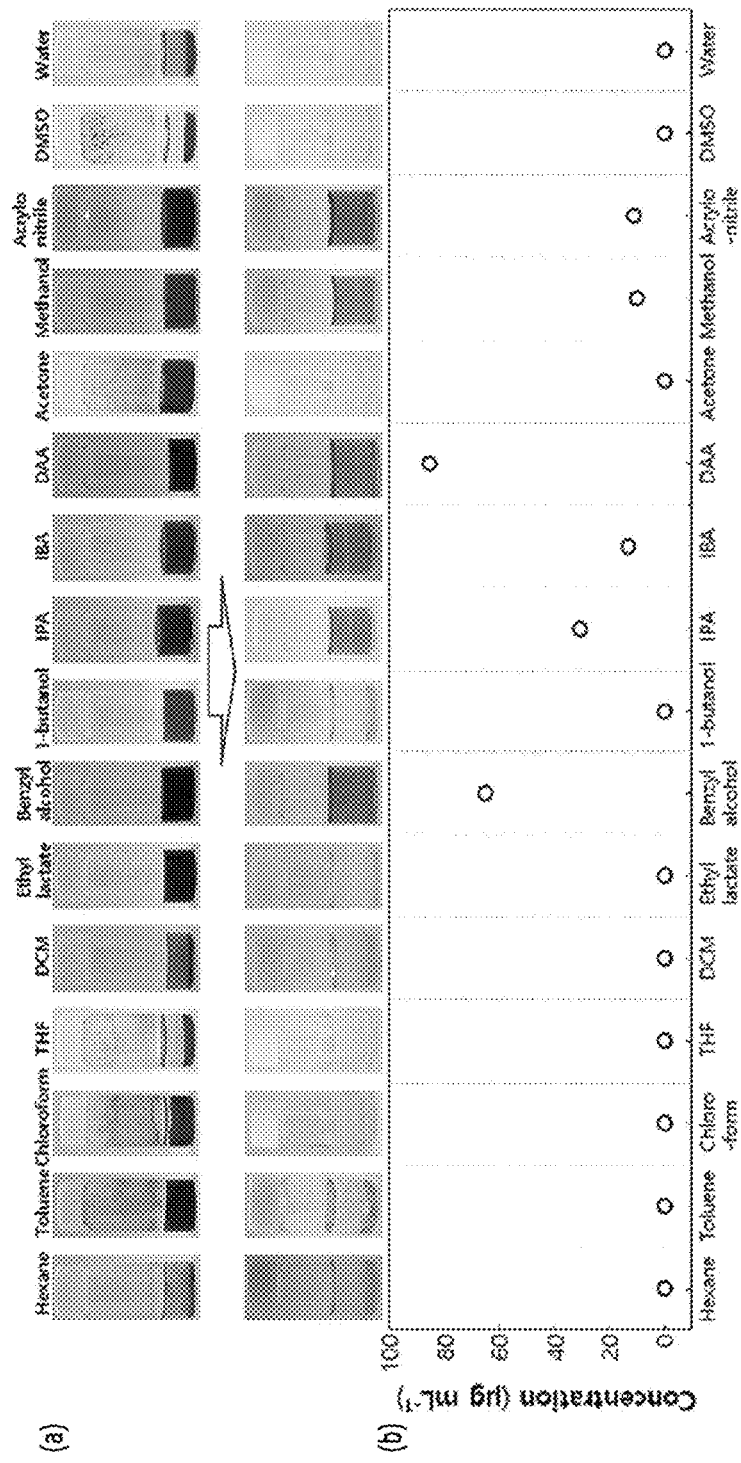

(a) of FIG. 16 shows solvents for powder according to an example of the present disclosure and the powder dispersed in the solvents and (b) of FIG. 16 is a graph showing the dispersion result.

Figure 17:
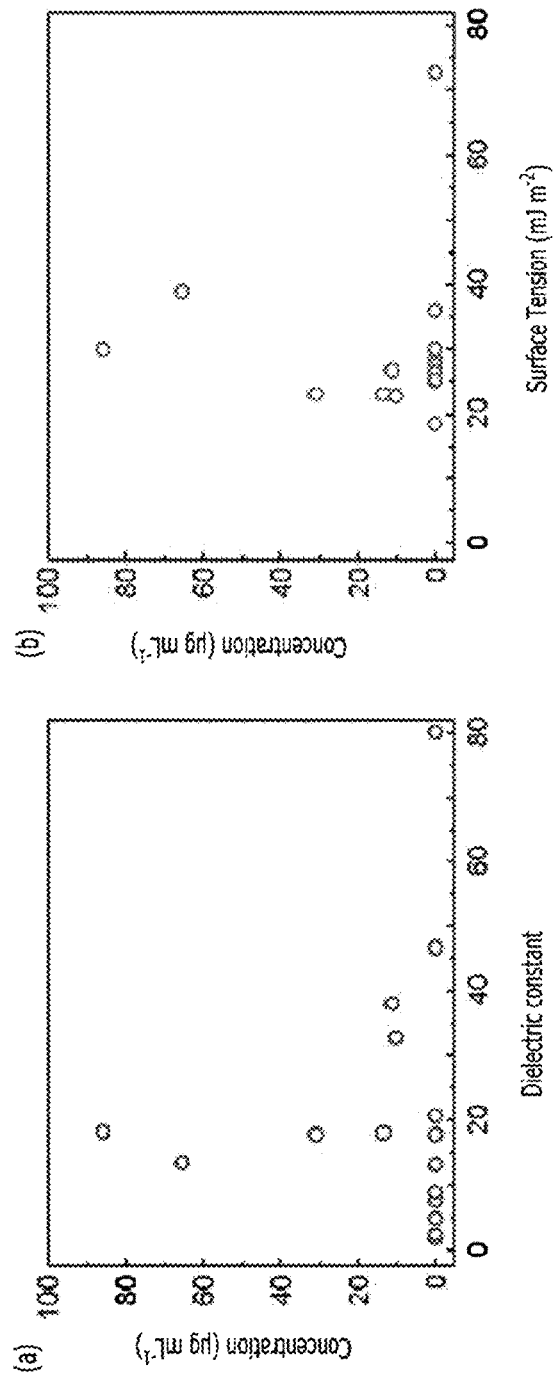

(a) of FIG. 17 is a graph of dispersion concentration of the powder against dielectric constant of the solvents according to an example of the present disclosure and (b) of FIG. 17 is a graph of dispersion concentration of the powder against surface tension of the solvents according to an example of the present disclosure.

Figure 18:
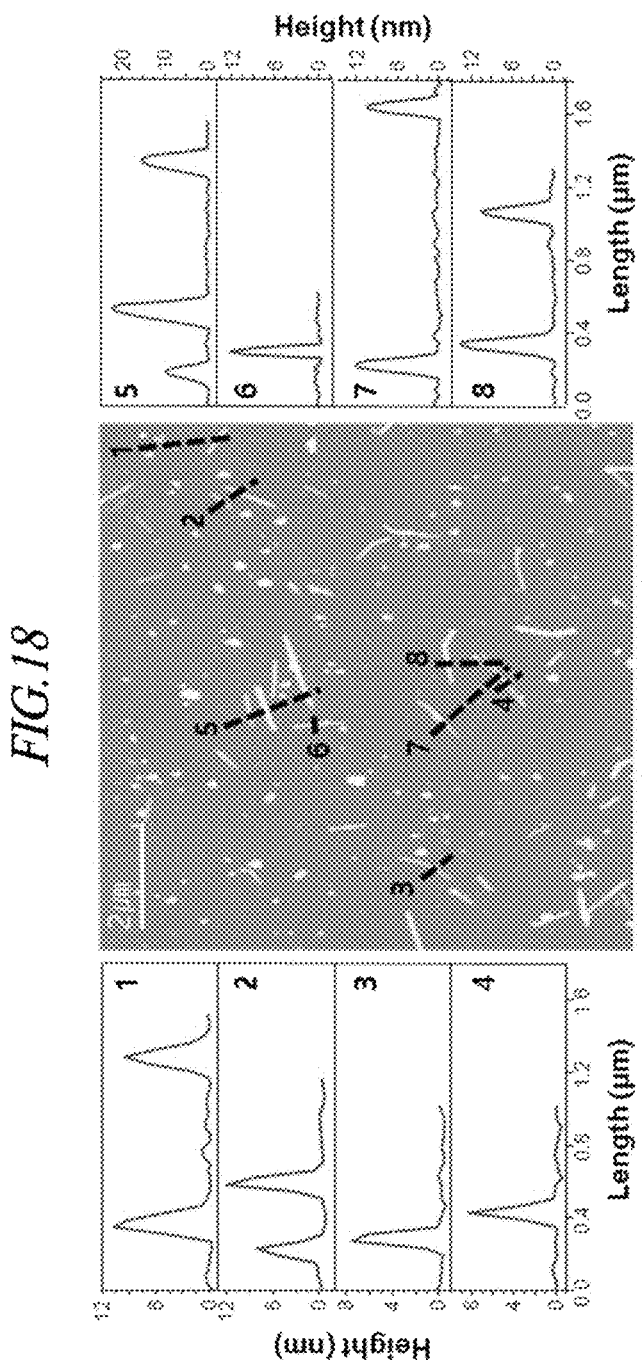

FIG. 18 shows an AFM image of a one-dimensional nano-chain structure according to an example of the present disclosure and a graph of height.

Figure 19:
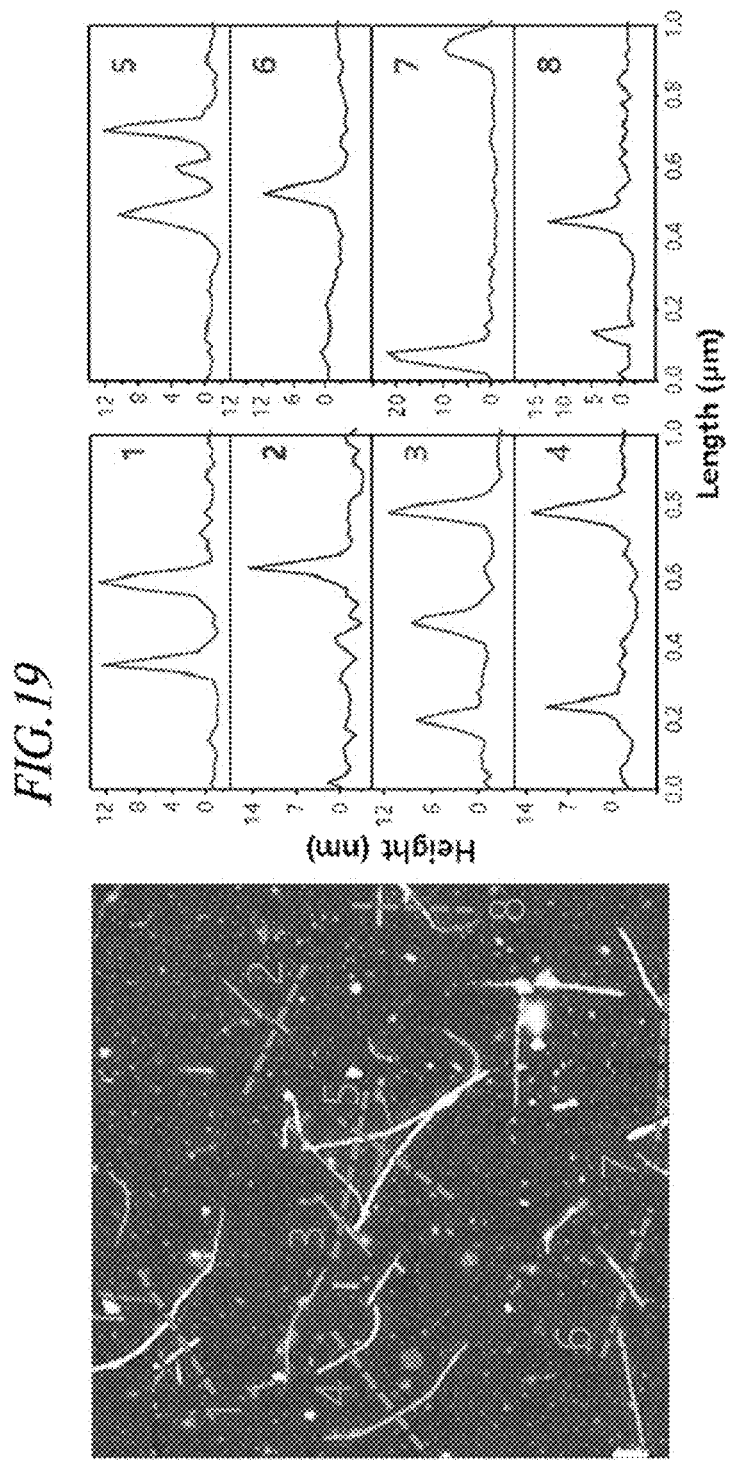
Figure 20:
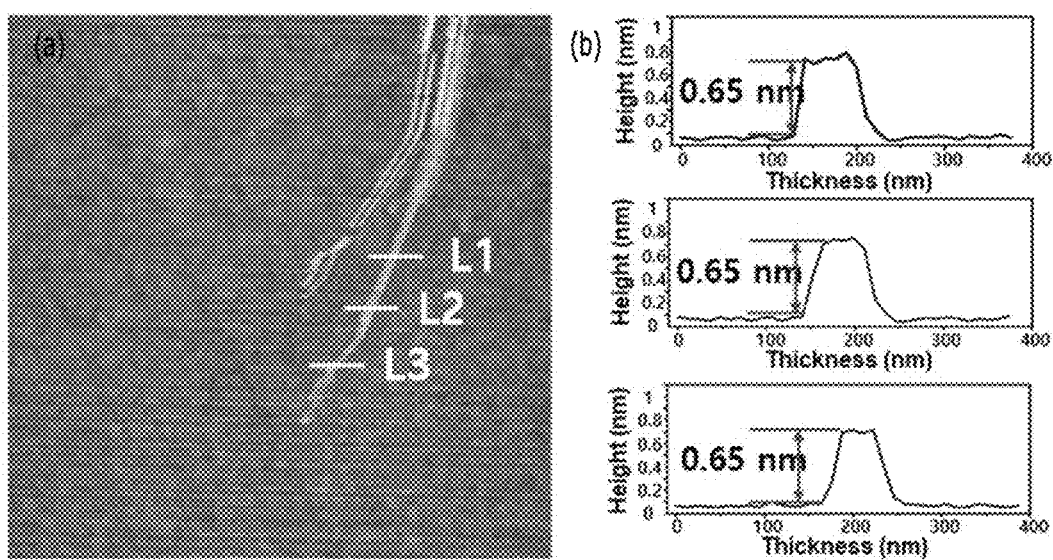
Figure 21:
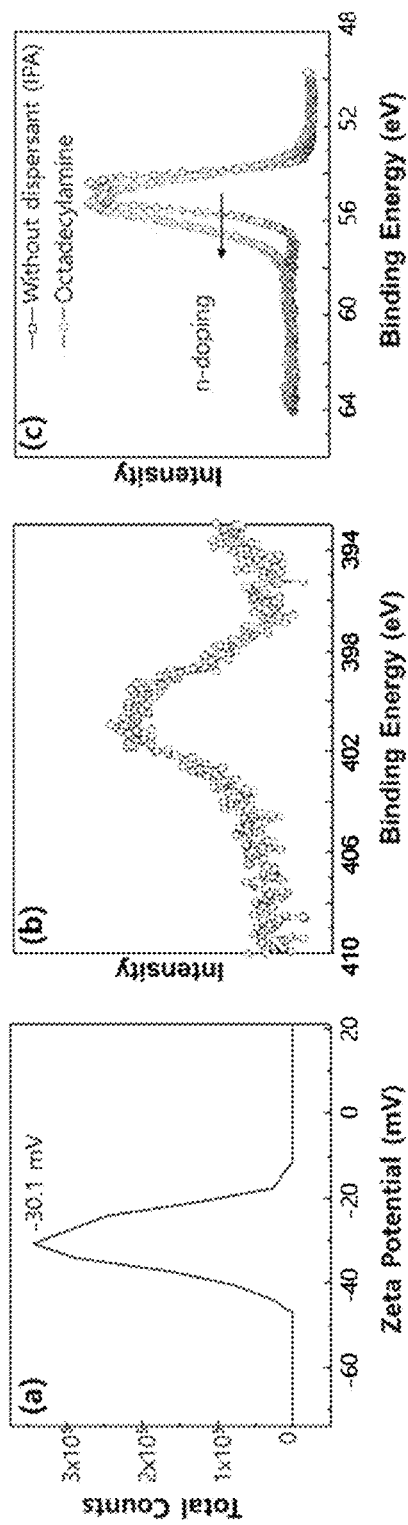
Figure 22:
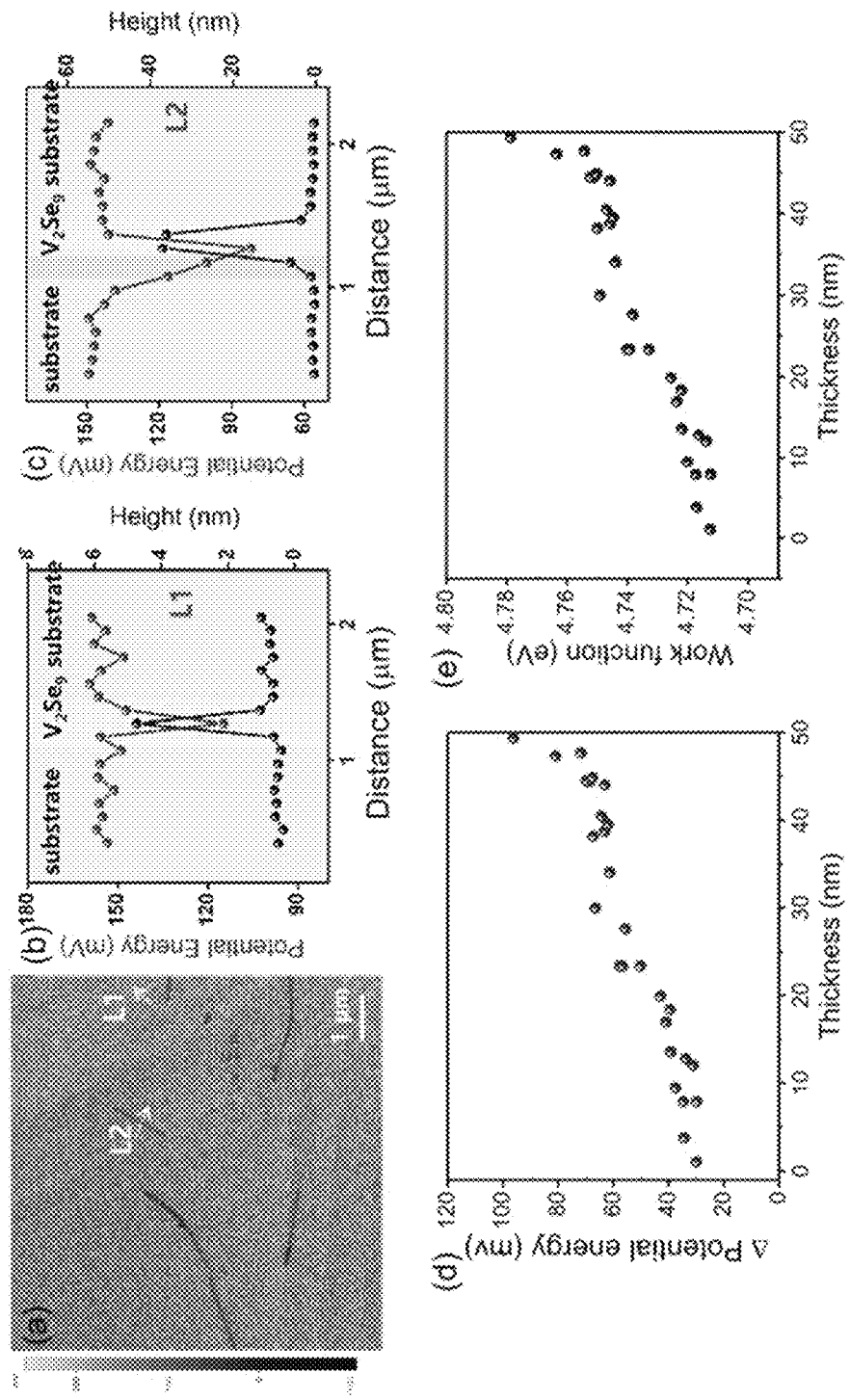
Figure 23:
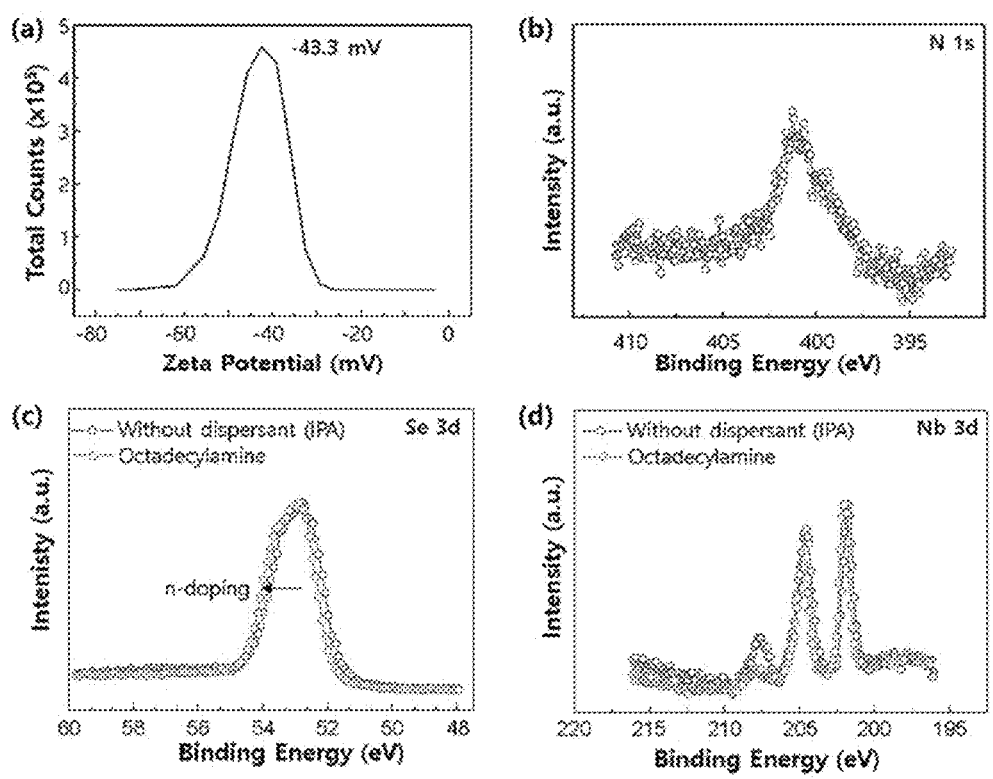
Figure 24:
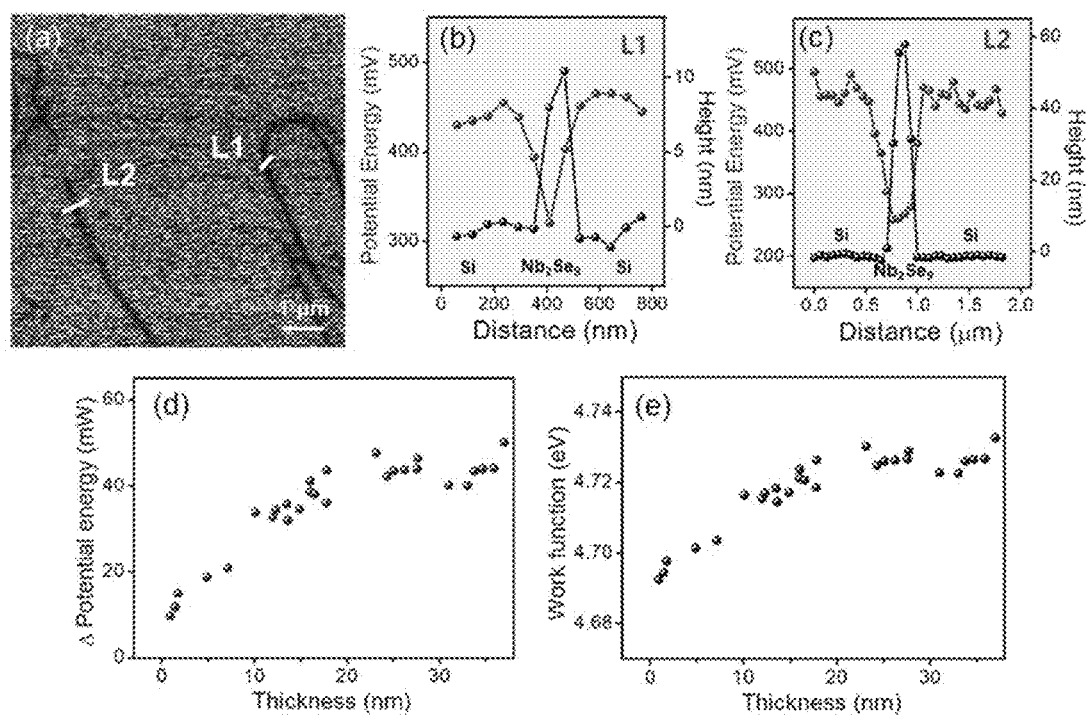
Figure 25:
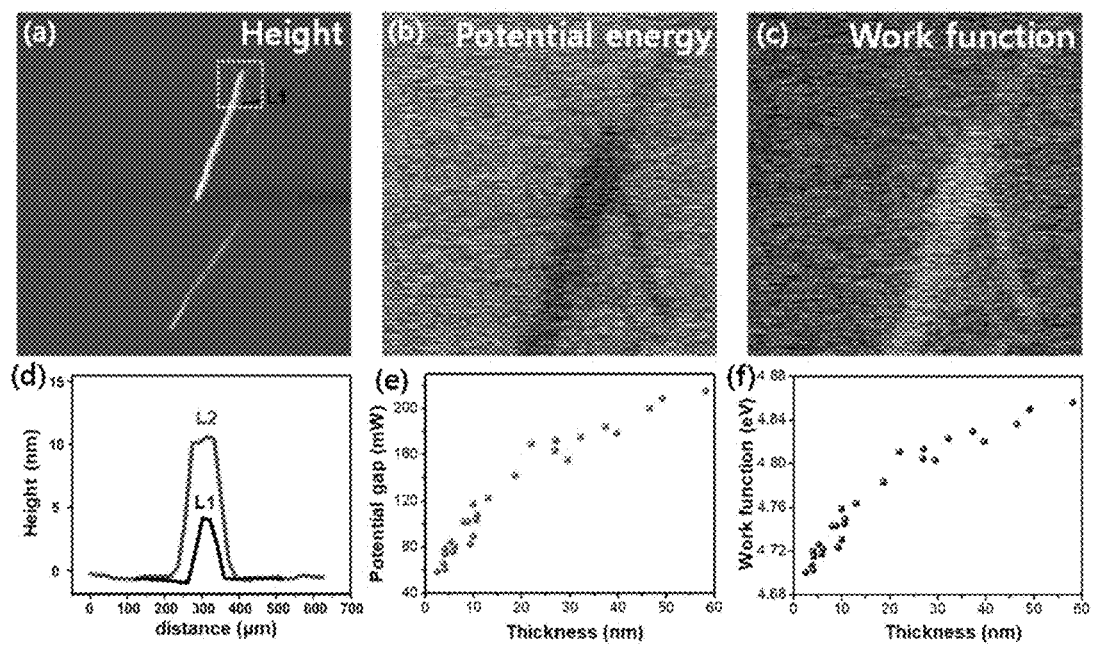

FIG. 19 shows an AFM image of a one-dimensional nano-chain structure according to an example of the present disclosure and a graph of height.
  (a) of FIG. 20 is an AFM image of a one-dimensional nano-chain structure according to an example of the present disclosure and (b) of FIG. 20 shows graphs of height for respective parts shown in (a) of FIG. 20.
  (a) of FIG. 21 is a graph of zeta potential of a one-dimensional nano-chain structure according to an example of the present disclosure and (b) and (c) of FIG. 21 are XPS spectra of the one-dimensional nano-chain structure according to an example of the present disclosure.
  (a) of FIG. 22 is a SKPM image of a one-dimensional nano-chain structure according to an example of the present disclosure, (b) and (c) of FIG. 22 are graphs of height against potential energy of the one-dimensional nano-chain structure according to an example of the present disclosure, (d) of FIG. 22 is a graph of difference in potential energy from a substrate against thickness of the one-dimensional nano-chain structure according to an example of the present disclosure, and (e) of FIG. 22 is a graph of work function against thickness of the one-dimensional nano-chain structure according to an example of the present disclosure.
  (a) of FIG. 23 is a graph of zeta potential of a one-dimensional nano-chain structure according to an example of the present disclosure and (b) to (d) of FIG. 23 are XPS spectra of the one-dimensional nano-chain structure according to an example of the present disclosure.
  (a) of FIG. 24 is a SKPM image of a one-dimensional nano-chain structure according to an example of the present disclosure, (b) and (c) of FIG. 24 are graphs of height against potential energy of the one-dimensional nano-chain structure according to an example of the present disclosure, (d) of FIG. 24 is a graph of difference in potential energy from a substrate against thickness of the one-dimensional nano-chain structure according to an example of the present disclosure, and (e) of FIG. 24 is a graph of work function against thickness of the one-dimensional nano-chain structure according to an example of the present disclosure.
  (a) of FIG. 25 is a height measurement image of a one-dimensional nano-chain structure according to an example of the present disclosure, (b) of FIG. 25 is a potential energy measurement image of the one-dimensional nano-chain structure according to an example of the present disclosure, (c) of FIG. 25 is a work function measurement image of the one-dimensional nano-chain structure according to an example of the present disclosure, (d) of FIG. 25 is a graph showing the height profile analysis result of the one-dimensional nano-chain structure according to an example of the present disclosure, (e) of FIG. 25 is a graph showing the potential energy profile analysis result of the one-dimensional nano-chain structure according to an example of the present disclosure, and (f) of FIG. 25 is a graph showing the work function profile analysis result of the one-dimensional nano-chain structure according to an example of the present disclosure.

Figure 26:
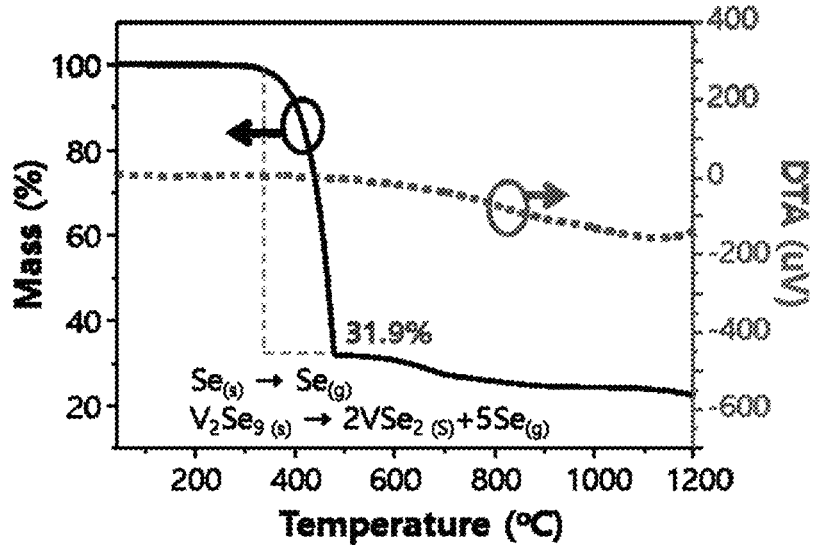
Figure 26:
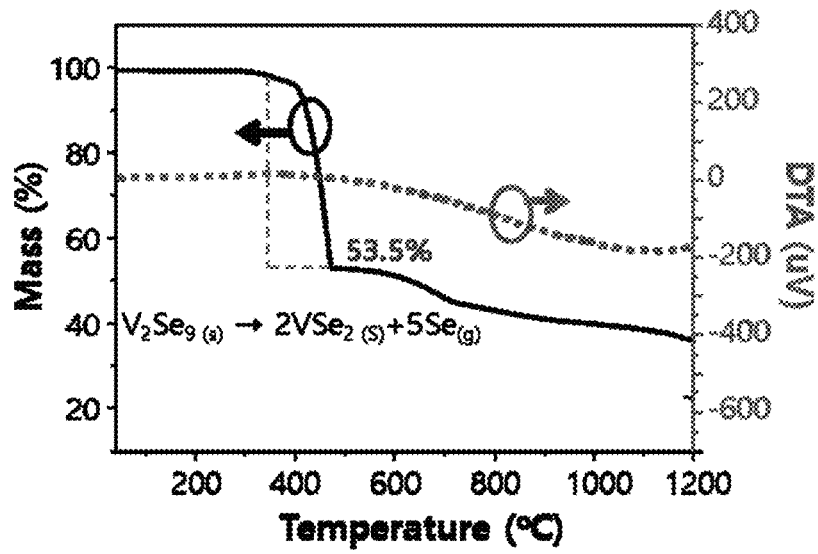

FIG. 26 shows graphs of DTA against sublimation temperature of a one-dimensional nano-chain structure according to an example of the present disclosure and a chalcogen precursor, respectively.

Figure 27:
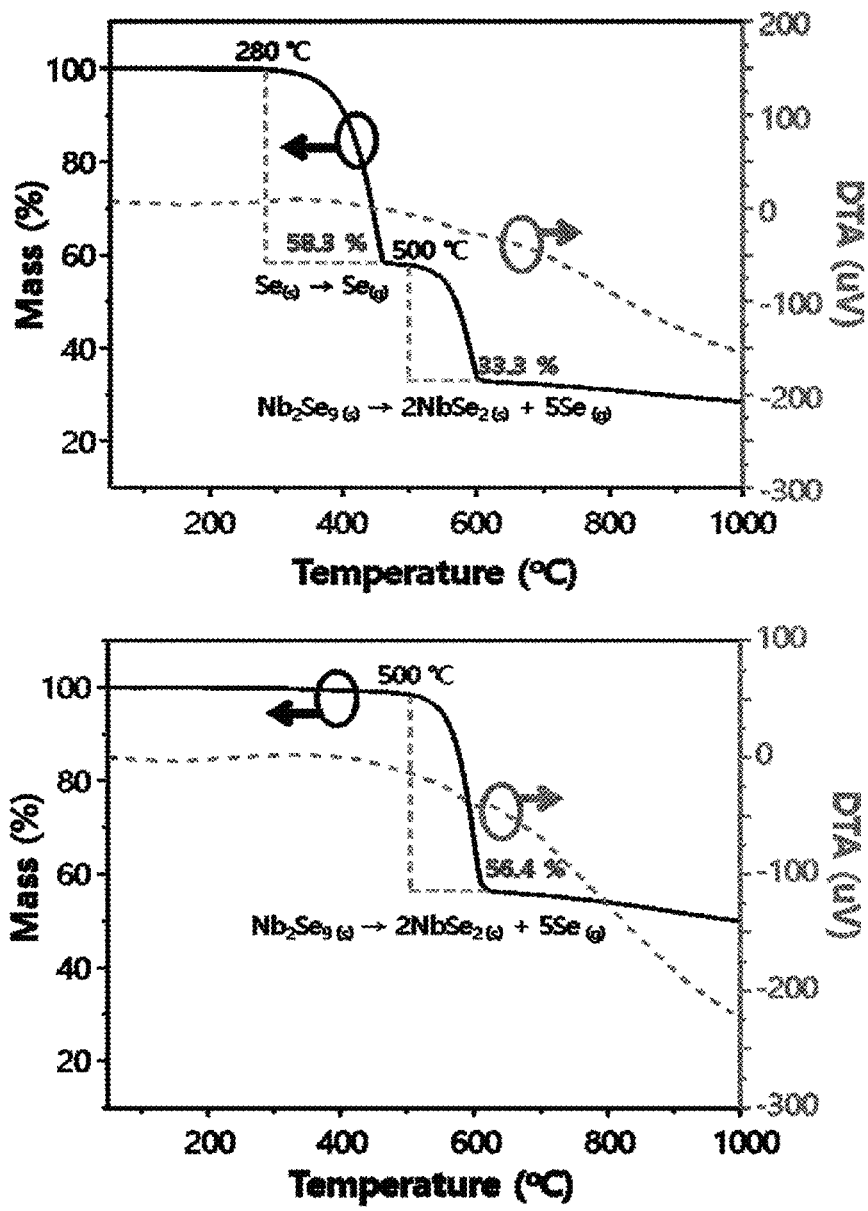

FIG. 27 shows graphs of DTA against sublimation temperature of a one-dimensional nano-chain structure according to an example of the present disclosure and a chalcogen precursor, respectively.

DETAILED DESCRIPTION

Hereinafter, embodiments of the present disclosure will be described in detail with reference to the accompanying drawings so that the present disclosure may be readily implemented by those skilled in the art.

However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the terms "on", "above", "on an upper end", "below", "under", and "on a lower end" that are used to designate a position of one element with respect to another element include both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereafter, a one-dimensional nano-chain structure and a preparing method thereof according to the present disclosure will be described in detail with reference to embodiments, examples, and the accompanying drawings. However, the present disclosure may not be limited to the following embodiments, examples, and drawings.

A first aspect of the present disclosure provides a one-dimensional nano-chain structure including a single crystal structure as a minimum repeat unit structure.

With the advancement of technology, micro parts have been more frequently used for the miniaturization and enhancement of performance of electronic devices. However, electronic devices using an existing bulk material are limited in miniaturization.

With the advancement of nano technology, it has been found that a one-dimensional material obtained by separating the bulk material into molecular units or atomic units or a two-dimensional material obtained by bonding one-dimensional materials has different electrical, mechanical, and chemical characteristics from the bulk material. Also, electronic devices using the one-dimensional are being actively researched.

The one-dimensional nano-chain structure according to the present disclosure is a nanomaterial in which a one-dimensional unit molecular chain forms a crystal without a chemical bond and refers to a material having a dimension of 10 nm or less in any one of width and thickness. In this regard, the one-dimensional nano-chain structure is formed of unit molecular chains bonded by a van der Waals force and thus simply has a one-dimensional shape due to the shape of its material but is distinguished from conventionally known one-dimensional materials, e.g., nanorods, nanowires, nanotubes, nanocables, and the like, formed by covalent bonds or ionic bonds.

In accordance with an embodiment of the present disclosure, the minimum repeat unit structure may include an inorganic molecule, but may not be limited thereto.

The conventionally known one-dimensional materials and the one-dimensional nano-chain structure according to the present disclosure are formed by repeating a repeat unit structure. However, the conventionally known one-dimensional materials, e.g., nanorods, nanowires, nanotubes, nanocables, and the like, are formed by repeating a repeat unit structure or particle in all directions based on a reference point, whereas the one-dimensional nano-chain structure is formed by repeating the minimum repeat unit structure in one direction only.

For example, a metal nanowire, which is a representative material of nanowires, includes metal particles bonded and concentrated in all directions such as up and down, left and right, forward and backward, and the like. However, the one-dimensional nano-chain structure of the present disclosure, e.g., $V_2Se_9$ which will be described later, includes $V_2Se_9$ repeat unit structures in one direction only.

In accordance with an embodiment of the present disclosure, the minimum repeat unit structure may be represented by the following Chemical Formula 1, but may not be limited thereto:

$$M_2X_9 \quad \text{[Chemical Formula 1]}$$

(in the above Chemical Formula 1, M is V, Nb, Ta, or Db, and X is S, Se, Te, or Po).

In accordance with an embodiment of the present disclosure, the one-dimensional nano-chain structure may include a unit structure selected from the group consisting of $V_2Se_9$, $Nb_2Se_9$, $Ta_2Se_9$, $Db_2Se_9$, $V_2Te_9$, $Nb_2Te_9$, $Ta_2Te_9$, $Db_2Te_9$, and combinations thereof, but may not be limited thereto.

Figure 1:
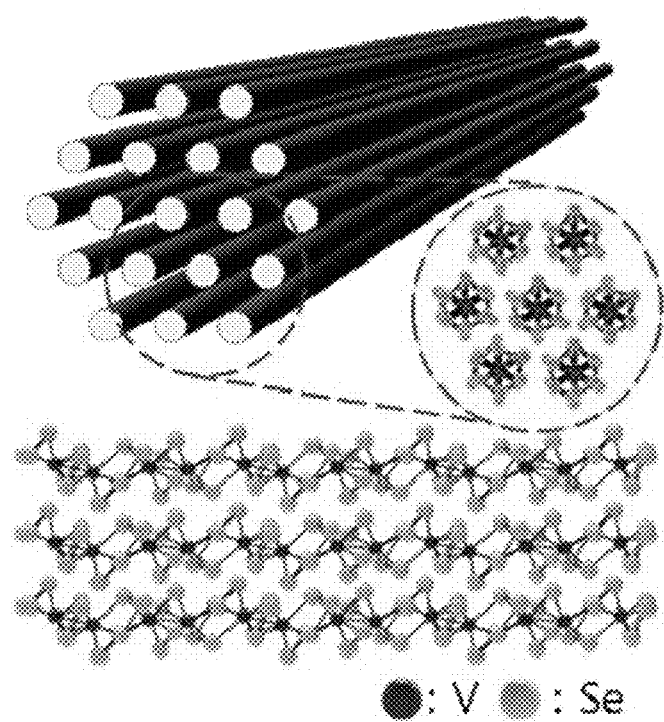
FIG. 1 is a schematic diagram of a one-dimensional nano-chain structure according to an embodiment of the present disclosure.
Figure 2:
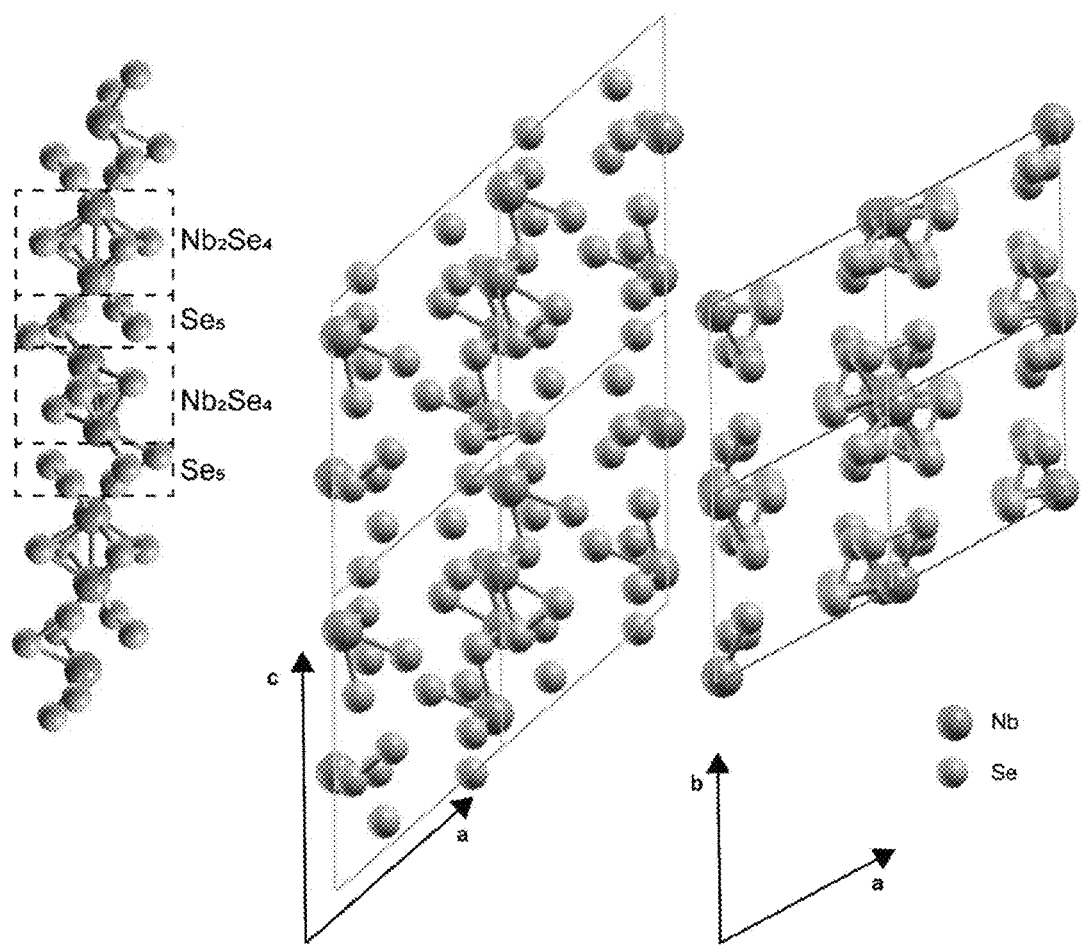
FIG. 2 is a schematic diagram of a one-dimensional nano-chain structure according to an embodiment of the present disclosure.

FIG. 1 and FIG. 2 are schematic diagrams of a one-dimensional nano-chain structure according to an embodiment of the present disclosure. Specifically, FIG. 1 is a schematic diagram of $V_2Se_9$ and FIG. 2 is a schematic diagram of $Nb_2Se_9$.

Referring to FIG. 1 and FIG. 2, it can be seen that the one-dimensional nano-chain structure has a shape in which metal cationic (V or Nb) chain structures are surrounded by anions (Se). 

In this regard, the anions and the metal cations may be covalently bonded.

Specifically, $V_2Se_9$ shown in FIG. 1 has a structure in which the peripheral 3d orbital of a transition metal V is bonded to Se. When the $V_2Se_9$ is heat-treated at about 400° C., Se may be sublimated to form $VSe_2$. However, it was observed that at a temperature lower than 400° C., the $V_2Se_9$ has excellent thermal stability and is dispersed to a thickness of about 1 nm or less in a specific solvent.

Further, $Nb_2Se_9$ shown in FIG. 2 may have a structure in which $NbSe_4$ and $NbSe_5$ are alternately placed. As will be described later, the one-dimensional nano-chain structure $Nb_2Se_9$ may be bonded in a direction a or b by a van der Waals force to form a one-dimensional nanostructure bundle or a one-dimensional single crystal bulk material.

In accordance with an embodiment of the present disclosure, the one-dimensional nano-chain structure may include $VS_4$, but may not be limited thereto.

$VS_4$ according to the present disclosure has a structure in which four S atoms are bonded around a V atom, and bulk $VS_4$ has been used as bonded to a graphene-based material. However, the one-dimensional nano-chain structure $VS_4$ exfoliated from the bulk $VS_4$ may have a dangling bond on its lateral surfaces and high flexibility unlike the existing bulk material.

As will be described later, the one-dimensional nano-chain structures may be bonded by a van der Waals force to form a two-dimensional nanostructure or one-dimensional nanostructure bundle.

In accordance with an embodiment of the present disclosure, the one-dimensional nano-chain structure does not have a dangling bond on its lateral surfaces, but may not be limited thereto.

A dangling bond is a kind of surface defect and refers to a broken part of an atomic bond. Atoms on the surface of a crystal or on a binding site within the crystal have some broken bonds due to coordinative unsaturation unlike atoms within a perfect crystal. These broken bonds are typically referred to as "dangling bonds". When an atom or molecule approaches the dangling bond, they easily form a chemical bond. Therefore, electrical, physical, mechanical, or chemical characteristics of an electronic device including a material having the dangling bond may be degraded by external environment, e.g., air or water.

To suppress the degradation in performance of the electronic device caused by the dangling bond, a part having the dangling bond is bonded to another material. Thus, it is possible to minimize the degradation in performance.

More specifically, the dangling bond is prone to be bonded to another material. In this case, the dangling bond enables electrons on the one-dimensional nano-chain structure not to move in an intended direction or enables the one-dimensional nano-chain structure to be oxidized or reduced. Since the one-dimensional nano-chain structure can be more affected by the dangling bond than a bulk material, an electronic device with higher performance can be obtained when fewer dangling bonds are present on the lateral surfaces of the one-dimensional nano-chain structure decreases.

As will be described later, the one-dimensional nano-chain structure, a one-dimensional nanostructure bundle including the one-dimensional nano-chain structures bonded to each other, and a one-dimensional single crystal bulk material do not have a dangling bond.

In accordance with an embodiment of the present disclosure, the one-dimensional nano-chain structure may have a thickness of 10 nm or less, but may not be limited thereto.

Specifically, the one-dimensional nano-chain structure may have a thickness of from 0.1 nm to 10 nm, but may not be limited thereto. For example, the one-dimensional nano-chain structure may have a thickness of from about 0.1 nm to about 10 nm, from about 1 nm to about 10 nm, from about 2 nm to about 10 nm, from about 3 nm to about 10 nm, from about 4 nm to about 10 nm, from about 5 nm to about 10 nm, from about 6 nm to about 10 nm, from about 7 nm to about 10 nm, from about 8 nm to about 10 nm, from about 9 nm to about 10 nm, from about 0.1 nm to about 9 nm, from about 0.1 nm to about 8 nm, from about 0.1 nm to about 7 nm, from about 0.1 nm to about 6 nm, from about 0.1 nm to about 5 nm, from about 0.1 nm to about 4 nm, from about 0.1 nm to about 3 nm, from about 0.1 nm to about 2 nm, from about 0.1 nm to about 1 nm, from about 1 nm to about 9 nm, from about 2 nm to about 8 nm, from about 3 nm to about 7 nm, from about 4 nm to about 6 nm, or about 5 nm, but may not be limited thereto.

In accordance with an embodiment of the present disclosure, the thickness of the one-dimensional nano-chain structure may vary depending on the minimum repeat unit structure, but may not be limited thereto.

In accordance with an embodiment of the present disclosure, the one-dimensional nano-chain structure may be bonded to each other by a van der Waals force, but may not be limited thereto.

The term "van der Waals force" as used herein does not refer to an electrostatic interaction of covalent bonding or ionic bonding, but refers to attraction or repulsion between molecules or parts in a molecule.

Further, a second aspect of the present disclosure provides a one-dimensional nanostructure bundle in which one-dimensional nano-chain structures according to the first aspect of the present disclosure are bonded by a van der Waals force.

As for the one-dimensional nanostructure bundle according to the second aspect, detailed descriptions of parts of the second aspect, which overlap with those of the first aspect, are omitted hereinafter, but the descriptions of the first aspect of the present disclosure may be identically applied to the second aspect of the present disclosure, even though they are omitted hereinafter.

The one-dimensional nanostructure bundle according to the present disclosure may include a two-dimensional planar structure, a two-dimensional bulk material, or a three-dimensional bulk material, but may not be limited thereto. Specifically, the one-dimensional nanostructure bundle refers to a structure in which the one-dimensional nano-chain structures are bonded by a van der Waals force.

According to the present disclosure, the van der Waals force is weaker than covalent bonding or ionic bonding. Thus, as will be described later, even when a small force is applied to the one-dimensional nano-chain structure, the one-dimensional nano-chain structure can be exfoliated.

Figure 3:
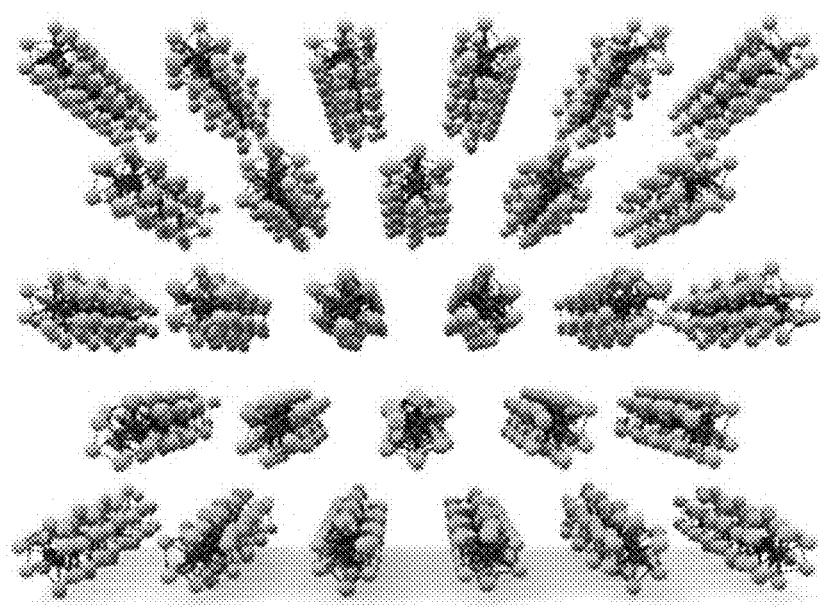
FIG. 3 is a schematic diagram of a one-dimensional nanostructure bundle according to an embodiment of the present disclosure.

FIG. 3 is a schematic diagram of a one-dimensional nanostructure bundle according to an embodiment of the present disclosure.

Referring to FIG. 3, the one-dimensional nanostructure bundle may have a two-dimensional or three-dimensional structure in which the one-dimensional nano-chain structures, e.g., $V_2Se_9$, are bonded by a van der Waals force.

Figure 4:
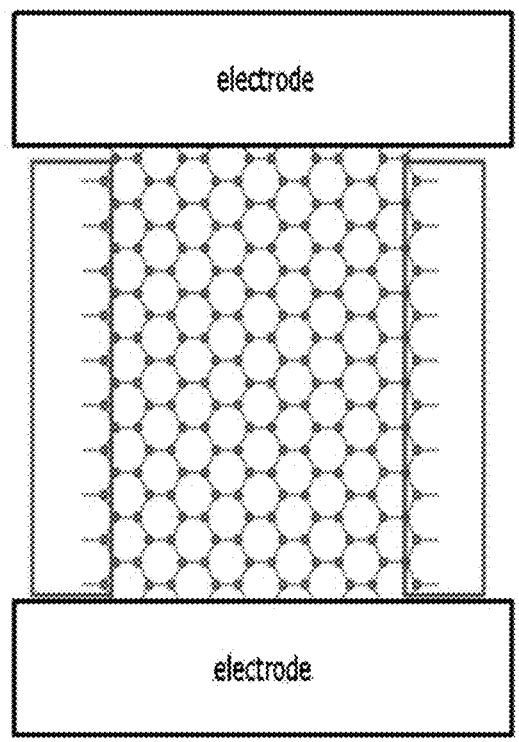
FIG. 4 provides schematic diagrams of a one-dimensional nanostructure bundle according to an embodiment of the present disclosure and a conventional two-dimensional material, respectively.
Figure 4:
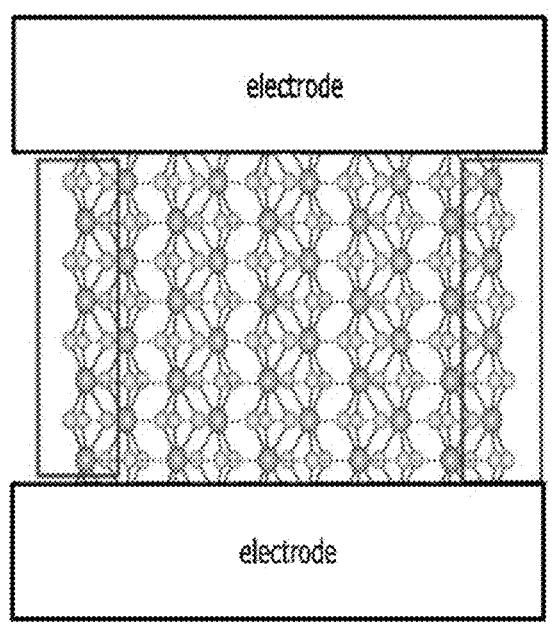

FIG. 4 provides schematic diagrams of a one-dimensional nanostructure bundle according to an embodiment of the present disclosure and a conventional two-dimensional material, respectively. For example, the one-dimensional nanostructure bundle may be a material in which the one-dimensional nano-chain structures are bonded by a van der Waals force and may refer to a one-dimensional single crystal bulk material.

Referring to FIG. 4, the conventional two-dimensional material has dangling bonds on its left and right surfaces as well as on its upper and lower ends to be bonded to an electrode and thus can be highly affected by water or electrons. However, the one-dimensional nanostructure bundle or the one-dimensional single crystal bulk material in which the one-dimensional nano-chain structures without a dangling bond are bonded by a van der Waals force does not have a dangling bond on its lateral surfaces, and, thus, it is possible to eliminate any problems caused by the dangling bond.

Furthermore, a third aspect of the present disclosure provides a preparing method of a one-dimensional nano-chain structure according to the first aspect of the present disclosure, including separating the one-dimensional nano-chain structure from a one-dimensional single crystal bulk material.

As for the preparing method of a one-dimensional nano-chain structure according to the third aspect, detailed descriptions of parts of the third aspect, which overlap with those of the first aspect, are omitted hereinafter, but the descriptions of the first aspect of the present disclosure may be identically applied to the third aspect of the present disclosure, even though they are omitted hereinafter.

In accordance with an embodiment of the present disclosure, the process of separating the one-dimensional nano-chain structure may be performed by an exfoliation method, but may not be limited thereto.

In accordance with an embodiment of the present disclosure, the exfoliation method may be selected from the group consisting of mechanical exfoliation, liquid exfoliation, ultrasonication, intercalation, electrochemical exfoliation, wet chemical exfoliation, reduction exfoliation, and combinations thereof, but may not be limited thereto.

In accordance with an embodiment of the present disclosure, the one-dimensional single crystal bulk material may include the one-dimensional nano-chain structures bonded by a van der Waals force, but may not be limited thereto.

The one-dimensional single crystal bulk material according to the present disclosure refers to a material in which one-dimensional nano-chain structures are bonded by a van der Waals force. In this regard, the one-dimensional single crystal bulk material may include a one-dimensional chain structure which has greater length, width, and thickness than the one-dimensional nano-chain structure, a two-dimensional nanostructure having a planar structure in which the one-dimensional nano-chain structures are arranged in a width direction, and a three-dimensional nanostructure in which the one-dimensional nano-chain structures are arranged in a width direction and a direction perpendicular to the width direction, but may not be limited thereto.

In accordance with an embodiment of the present disclosure, the preparing method of a one-dimensional nano-chain structure may include: dispersing the one-dimensional single crystal bulk material in a solvent; irradiating an ultrasonic wave to the solvent; and separating the one-dimensional nano-chain structure from the solvent, but may not be limited thereto.

In accordance with an embodiment of the present disclosure, the preparing method of a one-dimensional nano-chain structure may further include synthesizing the one-dimensional single crystal bulk material by a flux method, but may not be limited thereto.

In accordance with an embodiment of the present disclosure, the flux method may include mixing and heat-treating a transition metal precursor and a selenide precursor, but may not be limited thereto.

The flux method according to the present disclosure refers to a method of dissolving each ingredient of a material in a solvent or pelletizing powder, followed by crystallization at a relatively low temperature and growing of the crystallized material. The flux method is mainly used for preparing a material which has high thermal stability and thus has low thermal strain.

In this regard, the flux method may include dissolving the ingredients in the solvent at a high temperature, crystallizing the material by cooling the solvent, and growing the crystallized material, or may include mixing and pelletizing the ingredients and cooling the pelletized material.

In accordance with an embodiment of the present disclosure, the crystallization and the growing of the crystallized material in the flux method may be performed at a temperature of from room temperature to 800° C., but may not be limited thereto.

As described above, the one-dimensional single crystal bulk material includes the one-dimensional nano-chain structures bonded by a van der Waals force. In this regard, if the one-dimensional single crystal bulk material is dissolved in the solvent or grown at a predetermined temperature or higher, bonding by the van der Waals force can be damaged or the one-dimensional nano-chain structure can be converted into another material. Therefore, the flux method needs to be performed at a controlled temperature to maintain the one-dimensional nano-chain structure.

For example, pellets of Nb and Se may become the one-dimensional nano-chain structure $Nb_2Se_9$ at a temperature of from room temperature to about 800° C., from about 100° C. to about 800° C., from about 200° C. to about 800° C., from about 300° C. to about 800° C., from about 400° C. to about 800° C., from about 500° C. to about 800° C., from about 600° C. to about 800° C., from about 700° C. to about 800° C., from room temperature to about 700° C., from room temperature to about 600° C., from room temperature to about 500° C., from room temperature to about 400° C., from room temperature to about 300° C., from room temperature to about 200° C., from room temperature to about 100° C., from about 100° C. to about 700° C., from about 200° C. to about 600° C., from about 300° C. to about 500° C., or at about 400° C., but may not be limited thereto. Desirably, the pellets of Nb and Se may become the one-dimensional nano-chain structure $Nb_2Se_9$ at a temperature of from about 500° C. to about 800° C., but may not be limited thereto.

Further, for example, the one-dimensional nano-chain structure $V_2Se_9$ can be decomposed into $VSe_2$ and Se at a temperature of about 400° C. or higher. Thus, the flux method for growing a single crystal bulk material $V_2Se_9$ may be performed at a temperature of about 400° C. or lower, but may not be limited thereto. Desirably, the single crystal bulk material $V_2Se_9$ may be grown at a temperature of about 400° C. or lower, about 350° C. or lower, about 300° C. or lower, or about 250° C. or lower, but may not be limited thereto.

Furthermore, for example, the one-dimensional nano-chain structure $VS_4$ can be decomposed into V or $VS_2$, and $S_2$ at a temperature of about 400° C. or higher. Thus, the flux method for growing a single crystal bulk material $VS_4$ may be performed at a temperature of about 400° C. or lower, but may not be limited thereto. Desirably, the single crystal bulk material $VS_4$ may be grown at a temperature of about 400° C. or lower, about 350° C. or lower, about 300° C. or lower, or about 250° C. or lower, but may not be limited thereto.

In accordance with an embodiment of the present disclosure, the transition metal precursor may include a member selected from a group consisting of V, Nb, Ta, Db, and combinations thereof, but may not be limited thereto.

In accordance with an embodiment of the present disclosure, the selenide precursor may include a member selected from a group consisting of Se, S, Te, Po, and combinations thereof, but may not be limited thereto.

In accordance with an embodiment of the present disclosure, the atomic ratio of the transition metal precursor to the selenide precursor may be from 2:9 to 2:400, but may not be limited thereto. For example, the atomic ratio of the transition metal precursor to the selenide precursor may be from about 2:9 to about 2:400, from about 2:9 to about 2:300, from about 2:9 to about 2:250, from about 2:9 to about 2:200, from about 2:9 to about 2:180, from about 2:9 to about 2:160, from about 2:9 to about 2:140, from about 2:9 to about 2:120, from about 2:9 to about 2:100, from about 2:9 to about 2:80, from about 2:9 to about 2:60, from about 2:9 to about 2:40, from about 2:9 to about 2:20, from about 2:9 to about 2:10, from about 2:10 to about 2:400, from about 2:20 to about 2:400, from about 2:40 to about 2:400, from about 2:60 to about 2:400, from about 2:80 to about 2:400, from about 2:100 to about 2:400, from about 2:120 to about 2:400, from about 2:140 to about 2:400, from about 2:160 to about 2:400, from about 2:180 to about 2:400, from about 2:10 to about 2:300, from about 2:20 to about 2:250, from about 2:40 to about 2:200, from about 2:60 to about 2:180, from about 2:80 to about 2:160, from about 2:100 to about 2:140, or about 2:120, but may not be limited thereto.

In the preparing method of a one-dimensional nano-chain structure according to the present disclosure, an excessive amount of selenide is dissolved first in the solvent and uniformly reacted with the transition metal at a temperature lower than the melting point of selenide. Therefore, the one-dimensional nano-chain structure can be produced in the form of the one-dimensional single crystal bulk material. Further, the one-dimensional nano-chain structure can also be mass-produced by exfoliating or separating the one-dimensional single crystal bulk material.

To prepare the one-dimensional nano-chain structure according to the present disclosure, the one-dimensional single crystal bulk material is dissolved first in the solvent.

In accordance with an embodiment of the present disclosure, the solvent may include a functional group selected from the group consisting of a carboxyl group, a hydroxy group, an amine group, and combinations thereof, but may not be limited thereto.

In accordance with an embodiment of the present disclosure, the solvent may include a member selected from the group consisting of benzyl alcohol, isopropyl alcohol, isobutyl alcohol, acetone, diacetone alcohol, methanol, ethanol, acetonitrile, octadecylamine, aniline, nitromethane, pyridine, and combinations thereof, but may not be limited thereto.

When the one-dimensional single crystal bulk material is dispersed in the solvent, tyndall effect can be observed.

The tyndall effect refers to being able to see the path of scattered light when visible light is irradiated when particulates having a size similar to a wavelength of visible light are dispersed. Therefore, the size of the one-dimensional single crystal bulk material may be in a wavelength range of visible light, specifically from about 300 nm to about 700 nm, from about 350 nm to about 700 nm, from about 400 nm to about 700 nm, from about 450 nm to about 700 nm, from about 500 nm to about 700 nm, from about 550 nm to about 700 nm, from about 600 nm to about 700 nm, from about 650 nm to about 700 nm, from about 300 nm to about 650 nm, from about 300 nm to about 600 nm, from about 300 nm to about 550 nm, from about 300 nm to about 500 nm, from about 300 nm to about 450 nm, from about 300 nm to about 400 nm, or from about 300 nm to about 350 nm, but may not be limited thereto.

Then, an ultrasonic wave is irradiated to the solvent.

The process of irradiating an ultrasonic wave according to the present disclosure is performed to separate the one-dimensional nano-chain structure from the one-dimensional single crystal bulk material.

The ultrasonic wave is a representative example for separating the one-dimensional nano-chain structure from the one-dimensional single crystal bulk material dispersed in the solvent, and the one-dimensional nano-chain structure can be obtained by various methods, such as mechanical exfoliation, liquid exfoliation, intercalation, electrochemical exfoliation, wet chemical exfoliation, reduction exfoliation, and the like, depending on the kind of the one-dimensional single crystal bulk material.

As described above, the one-dimensional single crystal bulk material present as dispersed in the solvent is a material in which the one-dimensional nano-chain structures are bonded by a van der Waals force. However, bonding by the van der Waals force is weaker than covalent bonding, ionic bonding, or metallic bonding and thus can be easily broken by external irradiation of ultrasonic waves or the like.

For example, if the one-dimensional single crystal bulk material includes any one of $Nb_2Se_9$, $V_2Se_9$, or $VS_4$, when an ultrasonic wave is irradiated to the one-dimensional single crystal bulk material, bonding by the van der Waals force may be damaged and separated into a two-dimensional planar structure or a one-dimensional nano-chain structure.

Then, the one-dimensional nano-chain structure is separated from the solvent.

The one-dimensional nano-chain structure exfoliated from the one-dimensional single crystal bulk material dispersed in the solvent is dispersed in the solvent without bonding by a van der Waals force. That is, the one-dimensional nano-chain structure can be obtained by removing the solvent or filtering and drying the one-dimensional nano-chain structure.

Figure 5:
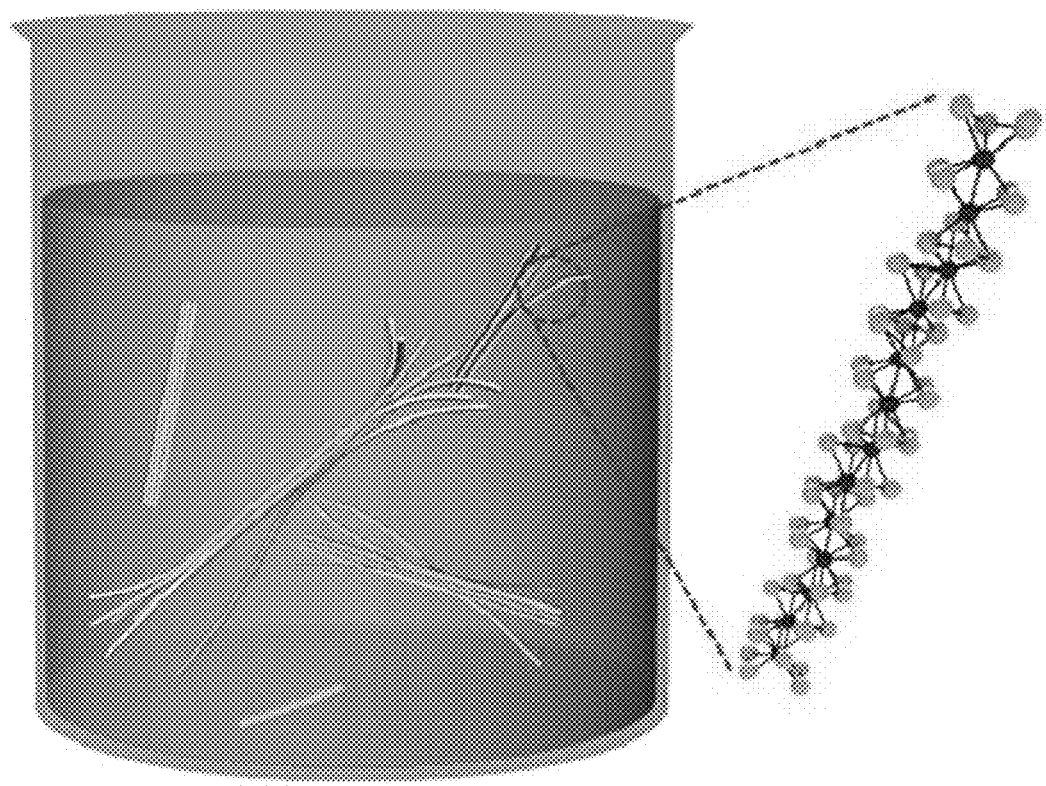
FIG. 5 is a schematic diagram showing a preparing method of a one-dimensional nano-chain structure according to an embodiment of the present disclosure.
Figure 6:
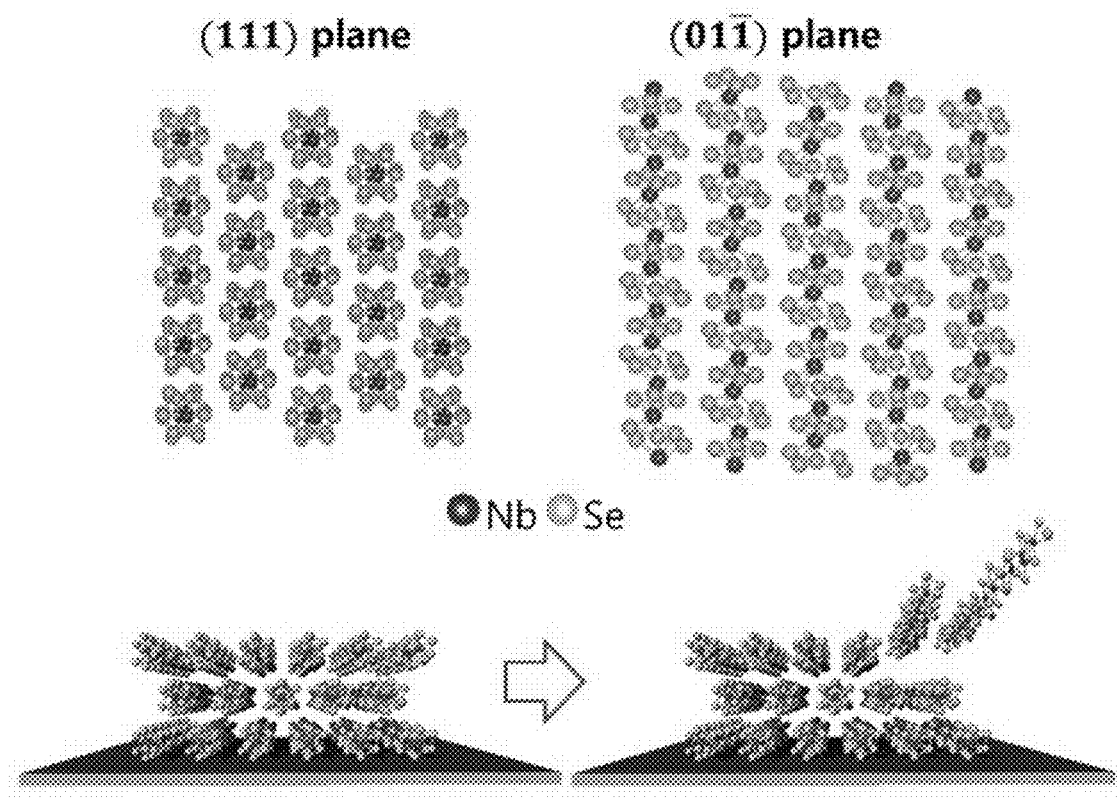
FIG. 6 is a schematic diagram showing a preparing method of a one-dimensional nano-chain structure according to an embodiment of the present disclosure.

FIG. 5 and FIG. 6 are schematic diagrams showing a preparing method of a one-dimensional nano-chain structure according to an embodiment of the present disclosure. More specifically, the one-dimensional nano-chain structure shown in FIG. 5 is $V_2Se_9$ and the one-dimensional nano-chain structure shown in FIG. 6 is $Nb_2Se_9$.

Referring to FIG. 5, a one-dimensional single crystal bulk material in which the one-dimensional nano-chain structures $V_2Se_9$ are three-dimensionally bonded by a van der Waals force can be dispersed in the solvent and easily exfoliated.

Referring to FIG. 6, a one-dimensional single crystal bulk material in which the one-dimensional nano-chain structures $Nb_2Se_9$ grown in (111) direction are three-dimensionally bonded by a van der Waals force can have a stacked structure of two-dimensional layered structures. In this case, bonding by the van der Waals force in the one-dimensional single crystal bulk material can be damaged by an ultrasonic wave, and, thus, the one-dimensional nano-chain structure can be exfoliated.

Hereinafter, the present disclosure will be described in more detail with reference to examples. The following examples are provided only for explanation, but do not intend to limit the scope of the present disclosure.

[Example 1]: Preparation of $V_2Se_9$ 0.2038 g of V powder (99.5%, Sigma-Aldrich) and 1.4214 g or 1.9898 g of Se powder (99+%, Alfa Aesar) having a particle size of 325 mesh were mixed and pelletized. Then, the pellets were placed in a 10 cm vacuum tube, and the vacuum tube was inserted into a box-shaped furnace and heated at 330° C. for 130 hours and then cooled at a speed of 4° C./h to obtain $V_2Se_9$ powder. Unreacted Se powder was sublimated for 24 hours at 250° C. with Ar flow of 100 sccm in a low-pressure tube furnace.

Then, 10 mg of the $V_2Se_9$ powder was dissolved in 10 ml of a solvent and ultrasonicated for 3 hours using a sonicator (VC505, Sonics & Materials, INC.) to disperse the powder. After ultrasonication, centrifugation was performed at a speed of 6000 rpm for 10 minutes to remove an unnecessarily exfoliated chain structure.

Figure 7:
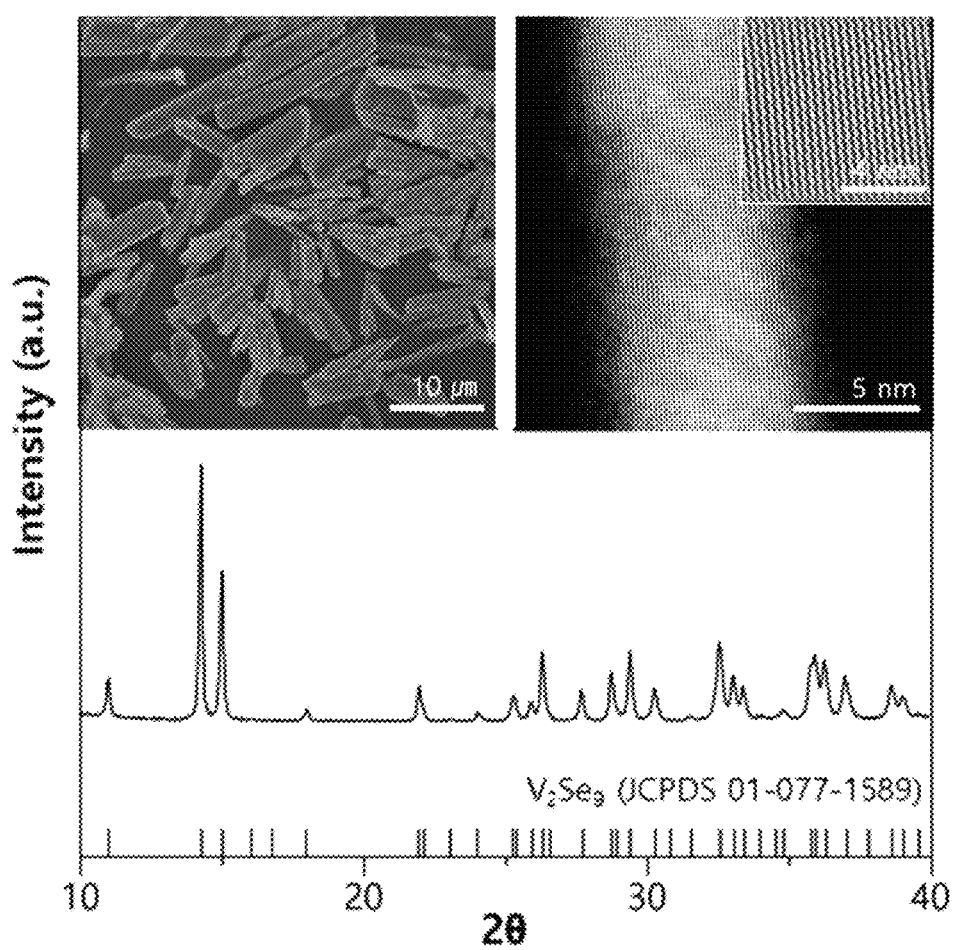
FIG. 7 shows an XRD pattern, a TEM image, and a SEM image of a one-dimensional nano-chain structure according to an example of the present disclosure.
Figure 8:
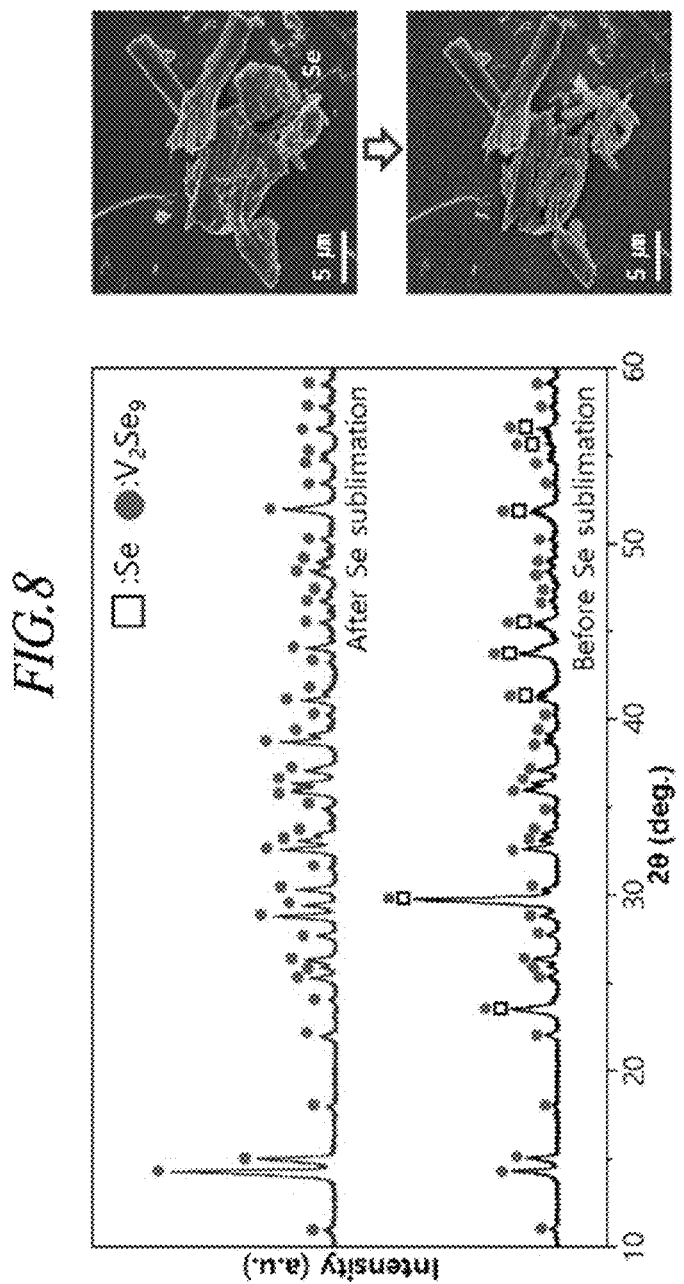
FIG. 8 shows an XRD pattern and SEM images of a one-dimensional nano-chain structure according to an example of the present disclosure.

FIG. 7 shows an XRD pattern, a TEM image, and a SEM image of $V_2Se_9$ according to Example 1, and FIG. 8 shows an XRD pattern and SEM images of $V_2Se_9$ according to Example 1.

Referring to FIG. 7, the XRD pattern of the $V_2Se_9$ shows high peaks when 20 is around 13 and 14, the SEM image shows that the $V_2Se_9$ has a very thin nanowire shape, and the TEM image shows that the diameter of the $V_2Se_9$ is less than 1 nm.

Also, referring to FIG. 8, it can be seen that since a process of preparing the $V_2Se_9$ includes a process of sublimating Se, hexagonal Se is completely removed and a $V_2Se_9$ crystal is located where the hexagonal Se was located.

[Example 2]: Preparation of $Nb_2Se_9$ 0.2 g of Nb powder (99.5%, Sigma-Aldrich) and 34 g of Se powder (99+%, Alfa Aesar) having a particle size of 325 mesh were mixed and pelletized. Then, the pellets were placed in a 10 cm vacuum tube, and the vacuum tube was inserted into a box-shaped furnace and heated at a temperature ranging from 500° C. to 800° C. for 72 hours and then cooled at a speed of 10° C./h to obtain $Nb_2Se_9$ powder having needle-shaped crystals. Unreacted Se powder was sublimated for 24 hours at 250° C. with Ar flow of 100 sccm in a low-pressure tube furnace. The vacuum tube was heated at 250° C. for 13 hours to obtain unreacted Se powder and then, the unreacted Se powder was sublimated for 24 hours at 250° C. with Ar flow of 100 sccm in a low-pressure tube furnace.

Then, 10 mg of the $Nb_2Se_9$ powder was dissolved in 10 ml of a solvent and ultrasonicated for 3 hours using a sonicator (VC505, Sonics & Materials, INC.) to disperse the powder. After ultrasonication, centrifugation was performed at a speed of 6000 rpm for 10 minutes to remove an unnecessarily exfoliated chain structure.

Figure 9:
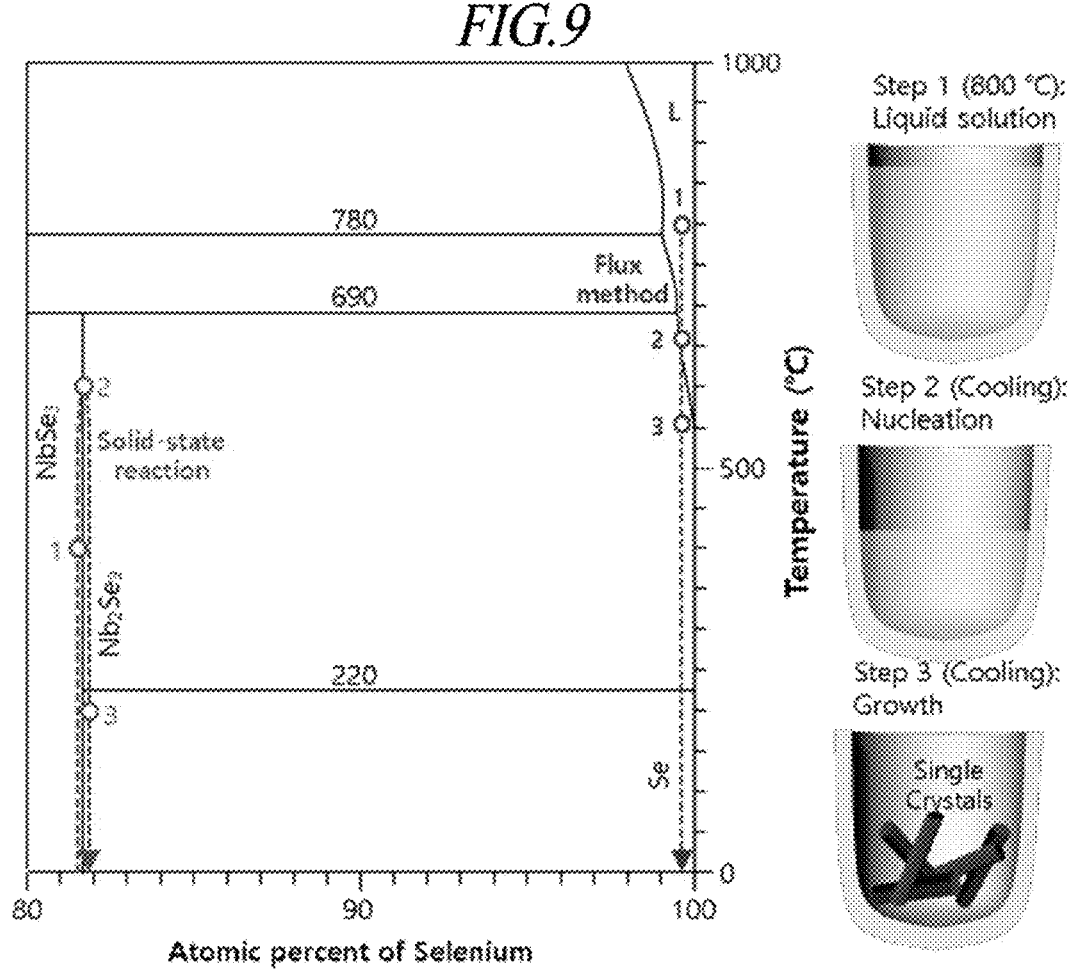
FIG. 9 shows a growth mechanism of a one-dimensional nano-chain structure according to an example of the present disclosure.

FIG. 9 shows a growth mechanism of a one-dimensional nano-chain structure according to Example 2.

Referring to FIG. 9, it can be seen that 100 times or more amount of Se atoms than Nb atoms may be needed to form $Nb_2Se_9$ and nano-chain single crystals of the $Nb_2Se_9$ grow by cooling.

(a) and (b) of FIG. 10 show an XRD pattern and SEM images of a one-dimensional nano-chain structure according to Example 2 depending on the process temperature, and (c) and (d) of FIG. 10 show an XRD pattern and SEM images of the one-dimensional nano-chain structure according to Example 2 depending on the proportion of materials.

Referring to FIG. 10, it can be seen that as the process temperature of the $Nb_2Se_9$ increases and as the amount of Se atoms increases compared to that of Nb atoms, the shape of the one-dimensional nano-chain structure becomes more apparent.

FIG. 11 shows TEM images of a one-dimensional nano-chain structure according to Example 2.

Referring to FIG. 11, it can be seen that $Nb_2Se_9$ is clearly distinguished and has a size of less than 10 nm with high crystallinity.

[Example 3]: Preparation of $VS_4$

High-purity vanadium (V) powder and high-purity sulfur (S) powder were mixed at a ratio of 1:4.1 and then loaded in a quartz ampoule, and the ampoule was exhausted until the remaining pressure reached $10^{-2}$ torr. The ampoule was sealed and heated at 400° C. and maintained at this temperature for 10 days. Then, the ampoule was cooled in a furnace. After the ampoule was opened, an excessive amount of dioxins was discharged at 200° C. To analyze the crystal structure, single crystals suitable for X-ray diffraction were manually separated from the reaction mixture to obtain a single crystal bulk material.

Then, the single crystal bulk material was placed on a tape and then repeatedly attached to and detached from the tape until a desired thickness was obtained. When a one-dimensional nano-chain structure was exfoliated with a desired thickness from the single crystal bulk material, the tape was pressed onto the substrate. About 5 minutes later, the tape was removed to obtain a one-dimensional nano-chain structure formed on the substrate.

FIG. 12 shows a scanning electron microscope (SEM) image and an EDS result graph of a one-dimensional bulk material according to Example 3, and FIG. 13 is a photomicrograph of the one-dimensional bulk material according to Example 3.

Referring to FIG. 12 and FIG. 13, it can be seen that a synthesized one-dimensional bulk material is $VS_4$ considering that the atomic ratio of V:S is 21:78 according to the SEM image of the synthesized one-dimensional bulk material and the EDS result.

Test Example 1

(a) of FIG. 14 shows solvents for powder according to Example 1, (b) of FIG. 14 shows the powder dispersed in the solvents, and (c) of FIG. 14 is a graph showing the dispersion result.

(a) of FIG. 15 is a graph of dispersion concentration of the powder against dielectric constant of the solvents according to Example 1 and (b) of FIG. 15 is a graph of dispersion concentration of the powder against surface tension of the solvents according to Example 1.

Referring to FIG. 14, the $V_2Se_9$ powder can be well dispersed when it is dissolved in isopropyl alcohol, isobutyl alcohol, acetone, or acetonitrile, and the dispersed $V_2Se_9$ powder can show tyndall effect.

Further, referring to FIG. 15, it can be seen that when the dielectric constant of a solvent is in the range of from 10 to 40 or the surface tension is in the range of from 20 mJ/m² to 35 mJ/m², the dispersion concentration of powder is high. Accordingly, it can be seen that the $V_2Se_9$ has a dielectric constant of from 10 to 40 and a surface tension of from 20 mJ/m² to 35 mJ/m².

(a) of FIG. 16 shows solvents for powder according to Example 2 and the powder dispersed in the solvents and (b) of FIG. 16 is a graph showing the dispersion result.

(a) of FIG. 17 is a graph of dispersion concentration of the powder against dielectric constant of the solvents according to Example 2 and (b) of FIG. 17 is a graph of dispersion concentration of the powder against surface tension of the solvents according to Example 2.

Referring to FIG. 16, the $Nb_2Se_9$ powder can be well dispersed in benzyl alcohol, isopropyl alcohol, isobutyl alcohol, diacetone alcohol, and methanol, and the dispersed $Nb_2Se_9$ powder can show tyndall effect.

Further, referring to FIG. 17, it can be seen that when the dielectric constant of a solvent is in the range of from 10 to 30 or the surface tension is in the range of from 25 mJ/m² to 40 mJ/m², the dispersion concentration of powder is high. Accordingly, it can be seen that the $Nb_2Se_9$ has a dielectric constant of from 10 to 30 and a surface tension of from 25 mJ/m² to 40 mJ/m².

Test Example 2

FIG. 18 shows an AFM image of the one-dimensional nano-chain structure according to Example 1 and a graph of height.

Referring to FIG. 18, it can be seen that the one-dimensional nano-chain structure $V_2Se_9$ has an average size of 16 nm and is present as well dispersed on the substrate.

FIG. 19 shows an AFM image of a one-dimensional nano-chain structure according to Example 2 and a graph of height.

Referring to FIG. 19, it can be seen that the one-dimensional nano-chain structure $Nb_2Se_9$ has a size of from 6 nm to 20 nm and is present as well dispersed on the substrate.

(a) of FIG. 20 is an AFM image of the one-dimensional nano-chain structure according to Example 3 and (b) of FIG. 20 shows graphs of height for respective parts shown in (a) of FIG. 20.

Referring to FIG. 20, it can be seen that the one-dimensional nano-chain structure $VS_4$ has a thickness of 0.65 nm.

Test Example 3

(a) of FIG. 21 is a graph of zeta potential of the one-dimensional nano-chain structure according to Example 1 and (b) and (c) of FIG. 21 are XPS spectra of the one-dimensional nano-chain structure according to Example 1. Also, (a) of FIG. 22 is a SKPM image of the one-dimensional nano-chain structure according to Example 1, (b) and (c) of FIG. 22 are graphs of height against potential energy of the one-dimensional nano-chain structure according to Example 1, (d) of FIG. 22 is a graph of difference in potential energy from a substrate against thickness of the one-dimensional nano-chain structure according to Example 1, and (e) of FIG. 22 is a graph of work function against thickness of the one-dimensional nano-chain structure according to Example 1.

Referring to FIG. 21, it can be seen that the zeta potential of the one-dimensional nano-chain structure $V_2Se_9$ dispersed in IPA is about −30.1 mV and the one-dimensional nano-chain structure $V_2Se_9$ dispersed in octadecylamine has a peak of N 1s, and a Se 3d peak of the $V_2Se_9$-shows higher binding energy when it is present in octadecylamine.

More specifically, it can be seen that nitrogen of the octadecylamine is observed from the exfoliated $V_2Se_9$ and when the octadecylamine is present in the IPA, binding energy increases, and, thus, the $V_2Se_9$ is N-doped.

Further, referring to FIG. 22, it can be seen that the $V_2Se_9$ is dispersed in a partial region and as the thickness of the $V_2Se_9$ increases, a difference in potential energy from the Si substrate and a work function increase.

More specifically, it can be seen that potential energy in L1 and L2 directions on the substrate is about 150 mV but decreases in the region where the V$_2$Se$_9$ is present. Accordingly, it can be seen that as the thickness of the V$_2$Se$_9$ increases, a difference in potential energy from the Si substrate and a work function increase.

(a) of FIG. 23 is a graph of zeta potential of the one-dimensional nano-chain structure according to Example 2 and (b) to (d) of FIG. 23 are XPS spectra of the one-dimensional nano-chain structure according to Example 2. Also, (a) of FIG. 24 is a SKPM image of the one-dimensional nano-chain structure according to Example 2, (b) and (c) of FIG. 24 are graphs of height against potential energy of the one-dimensional nano-chain structure according to Example 2, (d) of FIG. 24 is a graph of difference in potential energy from a substrate against thickness of the one-dimensional nano-chain structure according to Example 2, and (e) of FIG. 24 is a graph of work function against thickness of the one-dimensional nano-chain structure according to Example 2.

Referring to FIG. 23, it can be seen that the zeta potential of the one-dimensional nano-chain structure Nb$_2$Se$_9$ dispersed in IPA is about −43.3 mV and the one-dimensional nano-chain structure Nb$_2$Se$_9$ dispersed in octadecylamine has a peak of N is, and a Se 3d peak and a Nb 3d peak were observed. Accordingly, it can be seen that in the one-dimensional nano-chain structure Nb$_2$Se$_9$, Se and Nb share the 3d orbital and can be dispersed in the solvent by the help of an amine group.

More specifically, it can be seen that nitrogen of the octadecylamine is observed from the Nb$_2$Se$_9$ and an increase in binding energy of the Nb$_2$Se$_9$ which reacts with the octadecylamine shows that nitrogen is doped on the Nb$_2$Se$_9$ and adsorbed thereto.

Further, referring to FIG. 24, it can be seen that the Nb$_2$Se$_9$ is dispersed uniformly on the Si substrate except a partial region and as the thickness of the Nb$_2$Se$_9$ increases, a difference in potential energy from the Si substrate and a work function increase.

More specifically, it can be seen that potential energy in L1 and L2 directions on the substrate is about 400 mV but decreases in the region where the Nb$_2$Se$_9$ is present. Accordingly, it can be seen that as the thickness of the Nb$_2$Se$_9$ increases, a difference in potential energy from the Si substrate and a work function increase.

(a) of FIG. 25 is a height measurement image of the one-dimensional nano-chain structure according to Example 3, (b) of FIG. 25 is a potential energy measurement image of the one-dimensional nano-chain structure according to Example 3, (c) of FIG. 25 is a work function measurement image of the one-dimensional nano-chain structure according to Example 3, (d) of FIG. 25 is a graph showing the height profile analysis result of the one-dimensional nano-chain structure according to Example 3, (e) of FIG. 25 is a graph showing the potential energy profile analysis result of the one-dimensional nano-chain structure according to Example 3, and (f) of FIG. 25 is a graph showing the work function profile analysis result of the one-dimensional nano-chain structure according to Example 3.

Referring to FIG. 25, it can be seen that as the diameter of the one-dimensional nano-chain structure VS$_4$ decreases to several nanometer scale, a difference in potential energy between the one-dimensional nano-chain structure VS$_4$ and the Si substrate and a work function decrease.

Test Example 4

FIG. 26 shows graphs of DTA against sublimation temperature of the one-dimensional nano-chain structure according to Example 1 and a chalcogen precursor, respectively.

Referring to FIG. 26, the sublimation of Se can suppress the sublimation of the one-dimensional nano-chain structure V$_2$Se$_9$. Specifically, after the one-dimensional nano-chain structure V$_2$Se$_9$ was prepared and before Se was sublimated, there was a mass loss of 68.1% at 450° C. However, after Se was sublimated, there was a mass loss of 46.5%.

FIG. 27 shows graphs of DTA against sublimation temperature of the one-dimensional nano-chain structure according to Example 2 and a chalcogen precursor, respectively.

Referring to FIG. 27, the sublimation of Se can suppress the sublimation of the one-dimensional nano-chain structure Nb$_2$Se$_9$. Specifically, after the one-dimensional nano-chain structure Nb$_2$Se$_9$ was prepared and before Se was sublimated, there was a mass loss of 66.7% at 500° C. However, after Se was sublimated, there was a mass loss of 43.6%.

The above description of the present disclosure is provided for the purpose of illustration, and it would be understood by those skilled in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A one-dimensional nano-chain structure including a single crystal structure as a minimum repeat unit structure,
wherein the one-dimensional nano-chain structure does not have a dangling bond on its lateral surface and a plurality of the one-dimensional nano-chain structures can be bonded to each other by a van der Waals force, and
wherein the minimum repeat unit structure is repeated in one direction only, and is represented by the following Chemical Formula 1:

M$_2$X$_9$            [Chemical Formula 1]

(In the above Chemical Formula 1, M is V, Nb, Ta, or Db, and X is S, Se, Te, or Po).

2. The one-dimensional nano-chain structure of claim 1, wherein the one-dimensional nano-chain structure has a thickness of 10 nm or less.

3. The one-dimensional nano-chain structure of claim 1, wherein the minimum repeat unit structure includes an inorganic molecule.

4. The one-dimensional nano-chain structure of claim 1, wherein the one-dimensional nano-chain structure includes a unit structure selected from the group consisting of V$_2$Se$_9$, Nb$_2$Se$_9$, Ta$_2$Se$_9$, Db$_2$Se$_9$, V$_2$Te$_9$, Nb$_2$Te$_9$, Ta$_2$Te$_9$, Db$_2$Te$_9$, and combinations thereof.

5. A one-dimensional nanostructure bundle in which one-dimensional nano-chain structures of claim 1 are bonded by a van der Waals force.

6. A one-dimensional nano-chain structure including a single crystal structure as a minimum repeat unit structure, comprising a plurality of minimum repeat unit structures, each minimum repeat unit structure comprising at least a metal cation and an anion, wherein:
the plurality of minimum repeat unit structures consist of individual minimum repeat unit structures that are sequentially linked end to end to form a metal cationic chain structure, the metal cationic chain structure consists of metal cations from the sequentially linked individual minimum repeat unit structures, the metal cationic chain structure extends linearly in one dimension, the metal cationic chain structure is surrounded by anions from the sequentially linked individual minimum repeat unit structures, and the metal cationic chain structure is covalently bonded to the anions, and wherein the minimum repeat unit structure is represented by the following Chemical Formula 1:

$$M_2X_9 \quad \text{[Chemical Formula 1]}$$

(In the above Chemical Formula 1, M is V, Nb, Ta, or Db, and X is S, Se, Te, or Po).

\* \* \* \* \*